United States Patent
Okada et al.

(10) Patent No.: US 8,260,118 B2
(45) Date of Patent: Sep. 4, 2012

(54) VIDEO REPRODUCTION APPARATUS AND VIDEO REPRODUCTION METHOD

(75) Inventors: Shunji Okada, Kanagawa (JP);
Kenichiro Aridome, Kanagawa (JP);
Yukio Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 12/679,413

(22) PCT Filed: Oct. 20, 2008

(86) PCT No.: PCT/JP2008/068933
§ 371 (c)(1),
(2), (4) Date: Mar. 22, 2010

(87) PCT Pub. No.: WO2009/054333
PCT Pub. Date: Apr. 30, 2009

(65) Prior Publication Data
US 2010/0183277 A1   Jul. 22, 2010

(30) Foreign Application Priority Data

Oct. 23, 2007   (JP) .................................. 2007-274702

(51) Int. Cl.
*H04N 9/88* (2006.01)
*H04N 9/80* (2006.01)
(52) U.S. Cl. ........................................ 386/264; 386/242
(58) Field of Classification Search .................. 386/264, 386/242, 263, 239, 248
See application file for complete search history.

(56) References Cited

U.S. PATENT DOCUMENTS

| | | | |
|---|---|---|---|
| 6,784,927 B1 | 8/2004 | Itokawa | |
| 2006/0251409 A1 | 11/2006 | Tabuchi et al. | |
| 2006/0274978 A1 | 12/2006 | Fukuda et al. | |
| 2007/0266312 A1* | 11/2007 | Ayaki et al. | 715/526 |
| 2008/0111889 A1* | 5/2008 | Fujita et al. | 348/208.5 |

FOREIGN PATENT DOCUMENTS

| | | |
|---|---|---|
| JP | 11 187303 | 7/1999 |
| JP | 2004 248171 | 9/2004 |
| JP | 2006 60636 | 3/2006 |
| JP | 2006 295350 | 10/2006 |
| JP | 2006 295707 | 10/2006 |
| JP | 2007 134822 | 5/2007 |
| JP | 2007 195099 | 8/2007 |

* cited by examiner

*Primary Examiner* — Robert Chevalier
(74) *Attorney, Agent, or Firm* — Oblon, Spivak, McClelland, Maier & Neustadt, L.L.P.

(57) ABSTRACT

A lateral shake prevention when a video picked up by a digital camera is reproduced is realized, and viewing on a large screen television set is made comfortable.
At the time of the image pickup recording, face detection position center coordinate data is recorded in an attribute information unit of a stream as ARI data for each VOBU (GOP) in units of 0.5 seconds. At the time of the reproduction, the ARI data of GOP stream is collectively read ahead in units of RUV at the time of the reproduction of the video included in detection data of the face center position coordinate to read a large number of VOBUs in advance, an interpolation of missing times in units of GOP with respect to the face center position coordinate is performed, and a screen shift amount is subjected to a time axis smoothing computation through a time moving average computation in a frame unit.

8 Claims, 16 Drawing Sheets

PlayerPos::UpdateInfo()
graphic_PbFaceCenter::GetFaceCenterInformation()
graphic_PbFaceCenter::Dequeue()

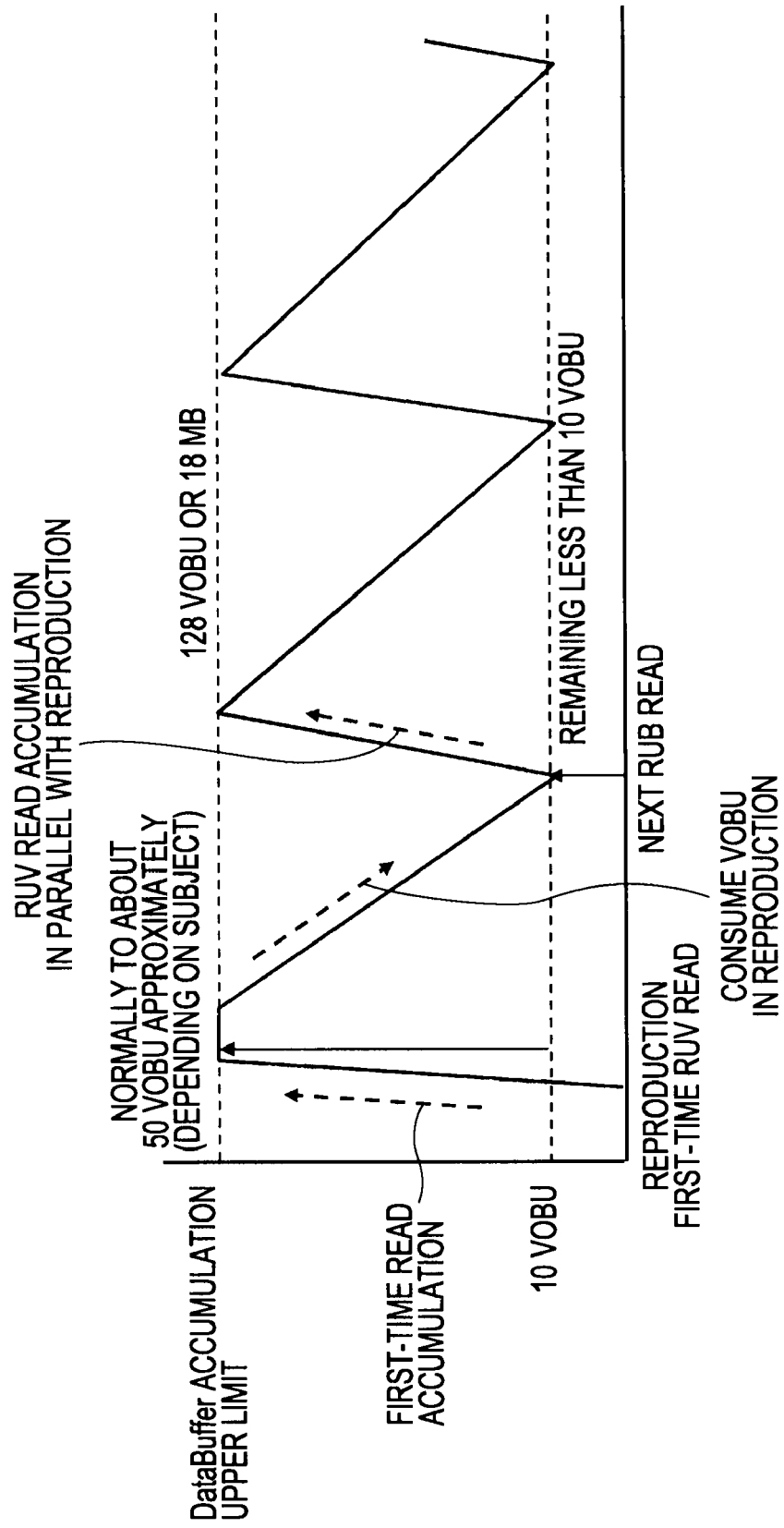

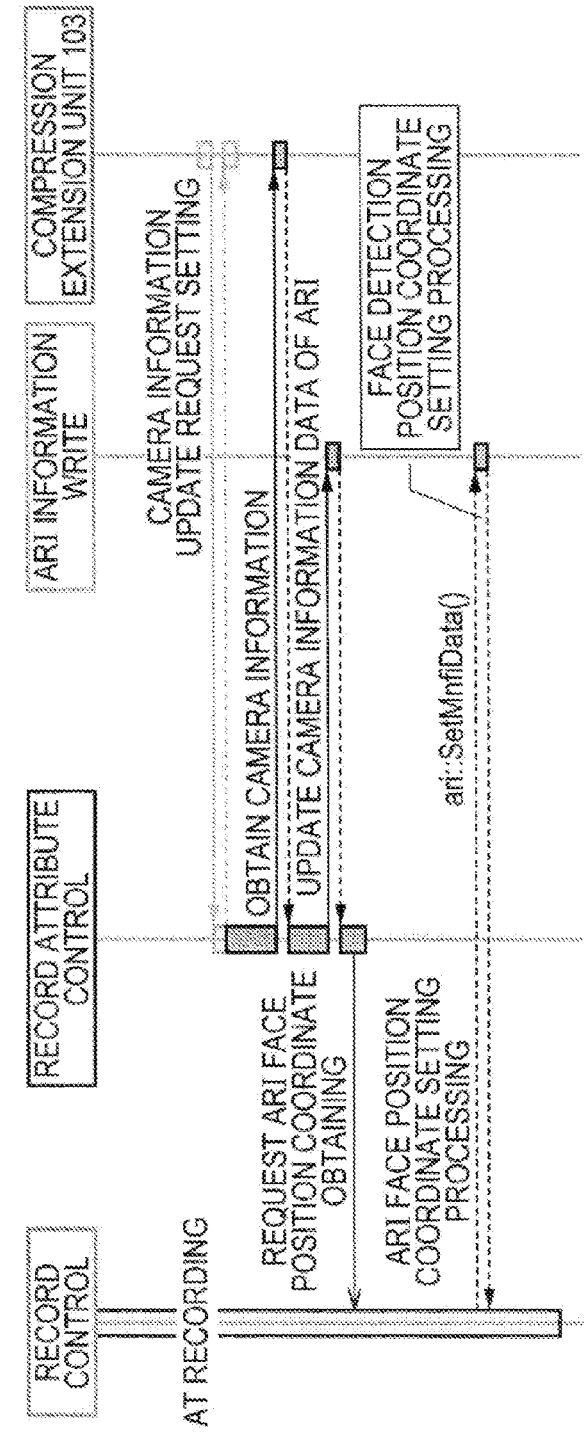

VIDEO REPRODUCTION APPARATUS AND VIDEO REPRODUCTION METHOD

TECHNICAL FIELD

The present invention relates to a video reproduction apparatus and a video reproduction method for recording a video on a recording medium such as a digital video camera, in particular, for example, a video reproduction apparatus and a video reproduction method for reproducing a video picked up at an individual level while an adverse affect such as a video shake is prevented.

Further in detail, the present invention relates to a video reproduction apparatus and a video reproduction method for reproducing while a lateral shake included in the picked up video is suppressed to prevent a viewer from developing a symptom similar to sea sickness, in particular, a video reproduction apparatus and a video reproduction method for suppressing a lateral shake of a face at the time of video production by using face detection position information at the time of image pickup recording.

BACKGROUND ART

Recently, instead of a silver salt camera for performing image pickup by using a film or a photographic plate, a digital camera for subjecting an image to a digital encoding processing for saving has been widely spread. The digital camera of this type picks up an image by a solid-state image pickup element in which a light receiving unit of a pixel array for performing photoelectric conversion and accumulation is composed of photo diodes. As the solid-state image pickup element, for example, CCD (Charge Coupled Device), CMOS (Comprementary Metal Oxide Semiconductor), or the like can be exemplified.

The image picked up by the digital camera is, for example, encoded in a predetermined encoding format such as MPEG (Moving Picture Experts Group) and thereafter recorded in a recording medium. Also, such a recorded image can be reproduced and output through decoding. For example, such a recorded image can be reproduced through a display apparatus such as LCD (Liquid Crystal Display) installed on the digital camera and further displayed and reproduced while the recording medium is taken out and mounted into another reproduction apparatus. Alternatively, along with a recent development of a network technology, by connecting the digital camera to a personal computer or other information equipment, even without performing a replacement operation for the recording medium, it is possible to perform data transfer of the image read out from the recording medium to be displayed or reproduced.

Incidentally, an individual inexpert on an image pickup technology often drastically moves the camera due to operational inexperience (for example, a large camera shake), which becomes a video shake to be recorded at the time of picking up a moving picture. Of course, a large number of digital cameras are equipped with a camera shake correction function such as mechanical type camera shake correction means for performing a correction by using an optical lens or electronic type camera shake correction means for performing a correction through an image processing on an image sensor. However, removal for the correction of a large shake is impossible, and the entirety of the picked up video is largely shaken.

If a video including a shake is viewed, a danger causing a video sickness is involved. When the video shake is categorized into a lateral shake and a vertical shake, the lateral shake is a phenomenon similar to sea sickness. Recently, even in a general household, a large screen television set is prevailed, and in particular, when a video shaken on the large screen is viewed, a viewer tends to have the video sickness from the video shake. In a case where the shake is particularly severe, an influence on a human body such as bout of vomiting or headache is generated, which is a problem also related to the safety of the video.

In a broadcasting production field, a video creation manual for coping with such video sickness is prepared. That is, in the case of previously controlled video contents in a broadcasting station or the like, a mechanism is proposed as a broadcasting system in which on a transmission side and a reception side, the adverse affect is prevented by controlling video signals via meta information indicating adverse affect video. In contrast to this, a regulation on the video picked up at the individual level is difficult, and the danger causing the video sickness is involved when the video picked up at the individual level is reproduced and output.

For example, an image pickup record reproduction apparatus is proposed in which when the picked up moving picture is encoded and recorded, reproduction control information is added for controlling so as to reduce the shake at the time of reproducing the moving picture corresponding to the large shake by detecting the large shake of the picked up moving picture, and when the moving picture is reproduced, the reproduction is controlled on the basis of the reproduction control information (for example, see Patent Document 1). However, the above-mentioned image pickup record reproduction apparatus is configured to previously prevent the video sickness as the large shake is stopped and changed to halt but is not configured to correct the video shake itself from the reproduced screen at the time of the moving picture reproduction.

Also, a moving picture record apparatus and a moving picture reproduction apparatus are proposed in which at the time of recording moving picture data, a deviation amount (including a deviation direction) between the current frame and one previous frame is detected through a known image processing, this deviation amount is recorded in a sub header of a chunk of the moving picture data as camera shake information, at the time of reproducing the moving picture data, an area B for a camera shake correction which is smaller than an entire area A of the original moving picture data is set in advance, and the moving picture data in the area B for the camera shake correction is cut out from the original moving picture data to be resized into a predetermined image size (for example, see Patent Document 2). According to such moving picture record apparatus and moving picture reproduction apparatus, in a case where the deviation amount between the current frame and the one previous frame is detected as the image deviation amount, even though the camera shake can be removed from the moving picture data, it is considered that the horizontal shake of the face cannot be sufficiently removed.

Patent Document 1: Japanese Unexamined Patent Application Publication No. 2007-134822
Patent Document 2: Japanese Unexamined Patent Application Publication No. 2004-248171

DISCLOSURE OF INVENTION

Technical Problem

An object of the present invention is, for example, to provide an excellent video reproduction apparatus and video reproduction method in which video picked up at an individual level can be reproduced while an adverse affect such as a video shake is prevented.

A further object of the present invention is to provide an excellent video reproduction apparatus and video reproduction method in which reproduction is performed while a lateral shake included in the picked up video is suppressed so that it is possible to prevent a viewer from developing a symptom similar to sea sickness.

Technical Solution

The present invention has been made in view of the above-mentioned problem and is a video reproduction apparatus for reproducing a video stream recorded on a recording medium together with attribute information accompanying in a predetermined moving picture format, face detection position information composed of a center position coordinate of a face detected from the video stream as the attribute information being recorded on the recording medium, the video reproduction apparatus being characterized by including:

read means configured to read the recorded video stream together with the attribute information from the recording medium;

decode means configured to decode the read video stream;

face shake correction means configured to predict a screen shift amount on the basis of the face detection position information included in the attribute information and correct a face shake included in the video stream; and output means configured to output video stream after the face shake is corrected.

For example, the video shake is often included in the video picked up at the individual level due to the operational inexperience or the like. In a case where the video picked up by the digital video camera is reproduced by the large screen television set or the like, when the severely shaken video is viewed, the video sickness easily occurs from the video shake, and the influence on the human body such as bout of vomiting or headache is generated, which is a problem also related to the safety of the video. Several image pickup record reproduction apparatuses are proposed for previously preventing the video sickness in a case where the large video shake which cannot be sufficiently removed through the camera shake correction function exists, but a reproduction apparatus or a reproduction method for preventing the video sickness due to the lateral shake of the face does not exist.

In contrast to this, according to the present invention, the face included in the video is detected by the face detection technology, the face detection position information composed of the center position coordinate of the face is recorded as the attribute information together with the picked up moving picture, and the lateral shake of the face is corrected by using the recorded face detection position information at the time of the video reproduction. As a result, even in a case where the user views the reproduced video on the large screen television set or the like, occurrence of the video sickness can be prevented.

The video reproduction apparatus according to the present invention reproduces the video data recorded on the recording medium through the encoding, for example, in the MPEG format. In the MPEG format, as one screen is generated on the basis of an image for a plurality of frames, a group composed of a plurality of frames called GOP is dealt with as a unit (widely known). Then, the face detection position information composed of the center position coordinate of the detected face of the subject included in the picked up video is recorded as the attribute information of the GOP. For example, for each GOP, in units of 0.5 seconds, the face detection position information composed of the center position coordinate of the detected face is recorded in the attribute information unit of the stream as the attribute information.

Also, at the time of the video reproduction, the video reproduction apparatus according to the present invention performs the read-ahead on the face detection position information recorded as the attribute information to be subjected to interpolation average in a time continuous manner and performs the control on the reproduction face shake correction of the video. At this time, the reproduction image is expanded at the face center coordinate and reproduced. If the recorded video is a high definition (HD) image, degradation of the image quality is not conspicuous when expanded to some extent. As the face detection position information recorded as the attribute information is read at the time of the reproduction, a temporally long read-ahead is realized. Therefore, for a period of the lateral coordinate position change data along the time elapse is long, the processing can be performed by reading, so that the lateral shake correction of the face for a satisfactory accuracy is realized.

At the time of the reproduction start, an image fine quality mode and an image aspect mode are obtained. At the time of the reproduction of the video including the recorded face detection position information, as the GOP attribute information including the face center position coordinate data of the GOP stream is collectively read for a large number of GOPs, a quick reference matrix for frame reproduction display times and face center position coordinates (hereinafter, which will also be referred to as "face position information table") is created in a field unit. Then, with respect to the face center position coordinate, a missing time is interpolated in a GOP unit, and through a time moving average computation in a frame unit, a shift amount of the face detection center position in the screen in the respective frames is subjected to a time axis averaging computation.

When a video expansion processing is performed, at a predetermined expansion rate where the center position coordinate of the detected face offset from the screen center is set as the center, by applying a center offset expansion processing of the reproduction image in the frame unit, the lateral correction of the reproduction video can be realized.

It should be noted that the read update of the face center position data in reproduction is carried out upon the collective read of the video stream at a timing when a read update request is generated to the reproduction stream buffer of the reproduction video stream.

Also, the read update request of the face detection position information is performed, and the face position information table is generated in the field unit, so that the prediction time change correction control on the presence or absence of the face detection and the center position coordinate of the detected face can be performed accurately and smoothly by using the relevant table on the GOP attribute information.

Advantageous Effects

According to the present invention, for example, it is possible to provide the excellent video reproduction apparatus and video reproduction method in which the video picked up at the individual level can be reproduced while the adverse affect such as the video shake is prevented.

Also, according to the present invention, it is possible to provide the excellent video reproduction apparatus and video reproduction method in which the reproduction is performed while the lateral shake included in the picked up video is suppressed so that the viewer can be prevented from developing the symptom similar to sea sickness.

Also, according to the present invention, it is possible to provide the excellent video reproduction apparatus and video reproduction method in which by using the face detection position information at the time of the image pickup recording, the lateral shake of the face can be preferably suppressed at the time of the video reproduction.

According to the present invention, by utilizing the attribute information at the time of the camera image pickup record reproduction of the encoded video audio stream and the read-ahead processing of the stream data, through the precise prediction of the face shake and the lateral shake correction of the face, it is possible to effectively prevent the human lateral shake of the reproduction video. For example, the prevention of the lateral shake when such individual video picked up by the digital camera is reproduced is realized, and the viewing on the large screen television set can be made comfortable.

Further objects, features, and advantages of the present invention will become apparent from the following detailed description based on exemplary embodiments of the present invention and the attached drawings.

BRIEF DESCRIPTION OF DRAWINGS

FIG. 9B shows a state in which VOBU data accumulated in a data buffer is consumed for the reproduction, and when running low, next RUV data is read and accumulated.

FIG. 11B shows a table storing a shift amount δλ for each field.

FIG. 12 is a sequence diagram showing a procedure for writing face detection center information in ARI data on an operation of performing record of a video stream.

EXPLANATION OF REFERENCE NUMERALS

100 IMAGE PICKUP RECORD REPRODUCTION APPARATUS, 101 SYSTEM CONTROL UNIT, 101A STILL IMAGE APPLICATION FORMAT CONTROL UNIT, 101B MOVING PICTURE APPLICATION FORMAT CONTROL UNIT, 101C MOVING PICTURE HD APPLICATION FORMAT CONTROL UNIT, 101D UDF LOGIC FILE SYSTEM UNIT, 101E FLASH FILE SYSTEM UNIT, 101F DVD/HDD DRIVE CONTROL UNIT, 102 VIDEO AUDIO INPUT OUTPUT INTERFACE, 102A FACE DETECTION CONTROL UNIT, 103 CODEC UNIT, 103A STILL IMAGE CODEC UNIT, 103B MOVING PICTURE CODEC UNIT, 103C MOVING PICTURE HD CODEC UNIT, 104 FLASH MEMORY DRIVE, 104A INTERFACE, 104B CIS INFORMATION RECORDING UNIT, 104C MULTI-WAY CACHE, 104D MEMORY CONTROL UNIT, 104E NVRAM BANK, 105 EXTERNAL DRIVE, 105A HOST INTERFACE, 105B DEVICE INFORMATION RECORDING UNIT, 105C DRIVE CACHE, 105D MEMORY CONTROL UNIT, 105E DISK, 106 DRIVE CONTROL UNIT, 107 DATA CONTROL UNIT, 108 PROGRAM MEMORY, 109 USER INTERFACE, 110 PC INPUT OUTPUT INTERFACE, 111 TIME DATA UNIT

BEST MODES FOR CARRYING OUT THE INVENTION

Hereinafter, with reference to the drawings, embodiments of the present invention will be described in detail.

Figure 1:
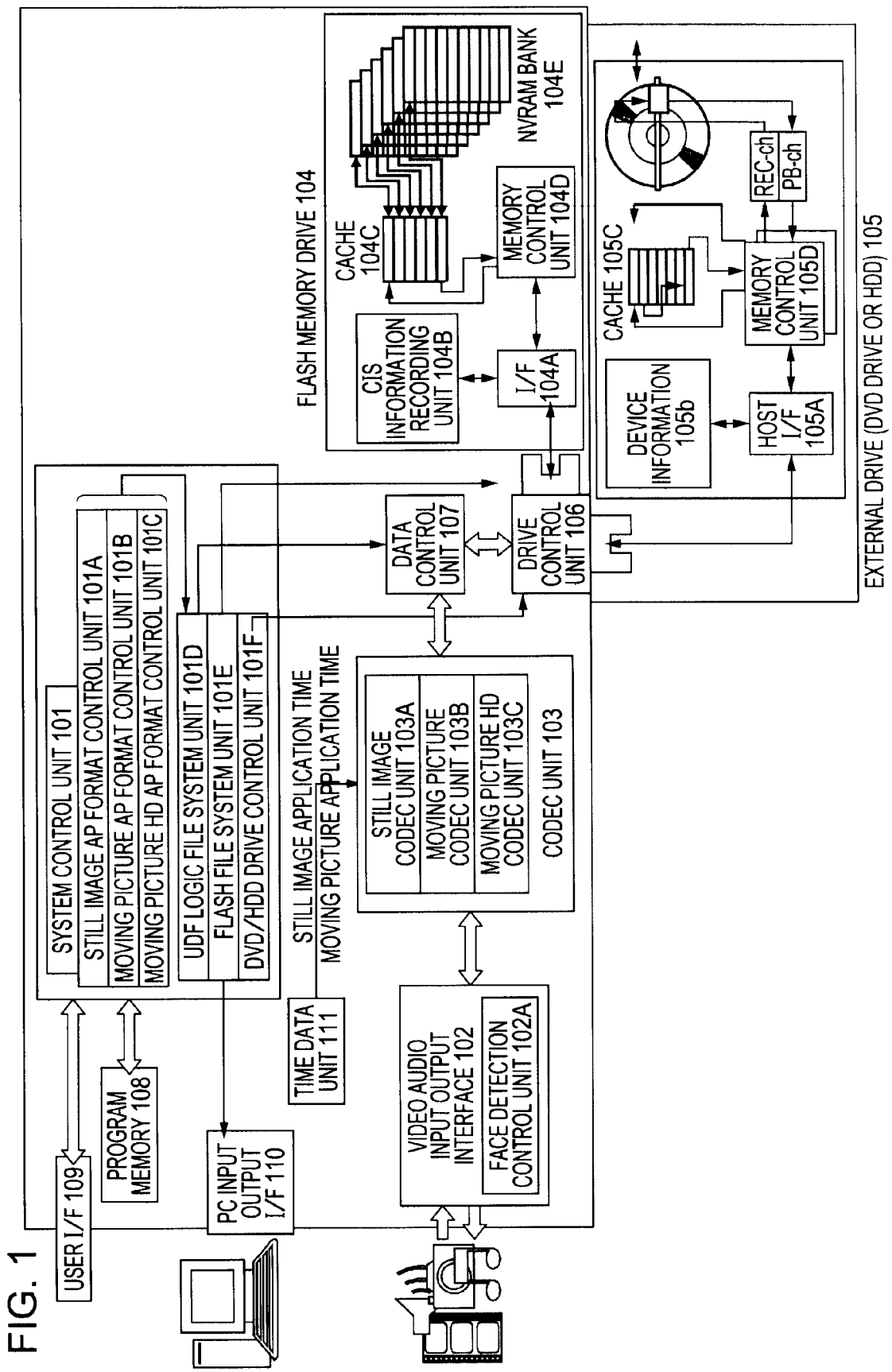
FIG. 1 schematically shows a configuration of an image pickup record reproduction apparatus 100 provided for an embodiment of the present invention.

FIG. 1 schematically shows a configuration of an image pickup record reproduction apparatus 100 provided for an embodiment of the present invention. The image pickup record reproduction apparatus 100 shown in the drawing performs, for example, data recording operations such as encoding of video audio stream data taken via a video audio input output interface 102, recording of encoded data into a flash memory drive 104, copy of the data recorded in the flash memory drive 104 into an external drive (DVD drive or HDD drive) 105 and data reproduction operations such as reading out of the data from the flash memory drive 104 or the external drive 105, a decoding processing for the read out data, and a screen output via a PC input output interface 110. Also, these operations are, basically, activated in accordance with use operations via a user interface 109. Hereinafter, the respective units of the image pickup record reproduction apparatus 100 will be described.

A system control unit 101 controls an operation of the entire relevant apparatus 100 in an overall manner by executing a program developed on a program memory 108. Main managements performed by the system control unit 101 are a file format management for the video audio stream data and a file system management for the flash memory drive 104 and the external drive 105.

A still image application format control unit 101A generates management information such as a file header for converting an encoded still image data into a still image application (AP) format, for example, JPEG (Joint Photographic Experts Group), JFIF (Jpeg File Interchange Format), Exif (Exchangeable Image file Format), TIFF (Tag Image File Format), or the like.

A moving picture application format control unit 101B generates management information for converting an encoded moving picture into a moving picture application file such as MPEG. To be specific, when the moving picture data encoded in the MPEG format is input, this is converted into a file group in conformity to an application format of the DVD Video and stored while following a UDF file system.

A moving picture HD application format control unit 101C generates management information for converting an encoded HD moving picture into an application format of an HD moving picture such as H.246.

A UDF (Universal Disk Format) logic file system unit 101D follows an optical disk format UDF established by OSTA (Optical Storage Technology Association) to perform a processing such as a file addition or a deletion with respect to the external drive 105 based on a packet write system (it should be however noted that the case is an optical disc drive such as a DVD drive) through a normal file system. A flash file system unit 101E is a file system taking into account a physical characteristic of an NVRAM (Non Volatile RAM) bank 104E in the flash memory drive 104 and performs an address management for the flash memory drive 104, garbage collection, averaging of the number of erase times, or the like. A DVD/HDD drive control unit 101F is equivalent to a device driver for the external drive 105 and performs recording, reproduction, or the like with respect to the external drive 105.

To the image pickup record reproduction apparatus 100, via the video audio input output interface 102, information equipment or AV equipment (a digital still camera, a digital video camera, and other source equipment for a still image or a moving picture) is connected in a wired or wireless manner, and exchange or the like of the still image data or the video audio stream data is performed.

According to the present embodiment, the video audio input output interface 102 is provided with a face detection control unit 102A and, for example, the center position coordinate of the face of the subject included in the video is detected, for example, for each GOP from the video stream data input from the digital video camera connected via the same interface 102 to be supplied to a moving picture codec unit 103B in a later stage. The face detection control unit 102A can detect the face center position coordinate on the basis of a known face recognition technology through a matching between a human face shake distribution and a pattern of face parts such as eyes and a mouth. Although the video shake in the video stream can be calculated from the face center position coordinate detected by the face detection control unit 102A, the detail will be given below.

A time data unit 111 is a device for counting a current time. According to the present embodiment, the time data unit 111 supplies a still image application time to a still image codec unit 103A and supplies a moving picture application time to the moving picture codec unit 103B.

A codec unit 103 performs data encoding and a decoding processing on the encoded data. The still image codec unit 103A performs encoding on the still image data input from the AV equipment and a decoding processing on the encoded still image data. The moving picture codec unit 103B performs encoding the moving picture stream data input from the AV equipment and a decoding processing on the encoded moving picture data. A moving picture HD codec unit 103C performs encoding on the moving picture HD input from the AV equipment and a decoding processing on the encoded moving picture HD data.

According to the present embodiment, when recording of the video stream data sent via the video audio input output interface is performed, the moving picture codec unit 103B records the face center position coordinate detected by the face detection unit 102A for each GOP as the attribute information of the GOP while being associated with the moving picture application time.

A data control unit 107 accumulates encoded video audio data and management information on this video audio data to prepare for the record start. A drive control unit 106 follows, for example, an ATAPI (AT Attachment Packet Interface) protocol, obtains inner drive firm information of the flash memory drive 104 or the external drive 105 to monitor a drive media state, and instructs a media record reproduction start in accordance with the drive media state. The drive control unit 106 performs a control for collectively recording RUVs (Recording Unit Video Object) in which a plurality of video object units where the video audio data is stored as the system stream in the GOP unit are set in packets on the media. For example, a repetitive control is performed for collectively recording onto the disc 105E when several tens of MBs are accumulated. It should be noted that in the optical disc, RUV is equivalent to a cell (CELL). The RUV or the CELL is a VOBU (Video OBject Unit) unit in which a collective write is performed onto the recording medium from the buffer through a single write operation or a collective read is performed from the reproduction media into the buffer through a single read operation.

The flash memory drive 104 is connected via the interface 104A to a memory control unit 104D. In a CIS (Card Information Structure) information recording unit 104B, a data format of the flash memory drive 104, a partition organization, vendor information, device information, and the like are recorded. The memory control unit 104D writes data temporarily stored in a multi-way cache 104C onto relevant memory chips in an NVRAM bank 104E (each of the memory chips is an IC (Integrated Circuit) chip for recording data).

The external drive 105, for example, a host interface 105A receives a command in conformity to the ATA specification from the drive control unit 106. A device information recording unit 105B records identification information on a device driver such as a model number. A memory control unit 105D performs a position control on an optical pickup (or a magnetic head) to record the data accumulated in a drive cache 105C which is a temporary recording area on the disc 105E. For example, a minimum recording unit of the DVD is referred to as ECC (Error Correcting Code) block, and 1 ECC block is 32K bytes.

When reproduction of the video audio data is instructed from the user interface 109, the UDF logic file system unit 101D or the flash file system unit 101E searches for a start sector and an end sector of the relevant stream file. The drive control unit 106 instructs the flash memory drive 104 or the external drive 105 to read out the data recorded in a start sector and an end sector. Subsequently, the data control unit 107 outputs the data read out from the external drive 105 to any one of the still image codec unit 103A, the moving picture codec unit 103B, and the moving picture HD codec unit 103C. The still image codec unit 103A decodes the read out encoded still image data, the moving picture codec unit 103B decodes the read out encoded moving picture data, and the moving picture HD codec unit 103C decodes the read out moving picture HD data. Then, the decoded data is transferred to an external equipment via a video audio interface 102 to be output to a LCD (Liquid Crystal Display), a speaker, and the like (none of which is shown in the drawing).

A PC, another video reproduction apparatus having a large screen, or the like is connected to a PC interface 110 by utilizing a wire such as USB (Universal Serial Bus) or a wireless, or an optical communication interface.

When transfer of the video audio data is instructed from the user interface 109, the UDF logic file system unit 101D or the flash file system unit 101E searches for the start sector and the end sector of the relevant stream file, and the drive control unit 106 instructs the flash memory drive 104 or the external drive 105 to read out the data recorded in the start sector and the end sector. Then, the read data is transferred to an equipment at a transfer destination via the PC interface 110.

As already described above, the UDF logic file system unit 101D follows the UDF format to perform the processing such as the file addition or the deletion with respect to the external drive 105 through a normal file system. The UDF logic file system unit 101D constructs the UDF file system on the flash memory drive 104.

Figure 2A:
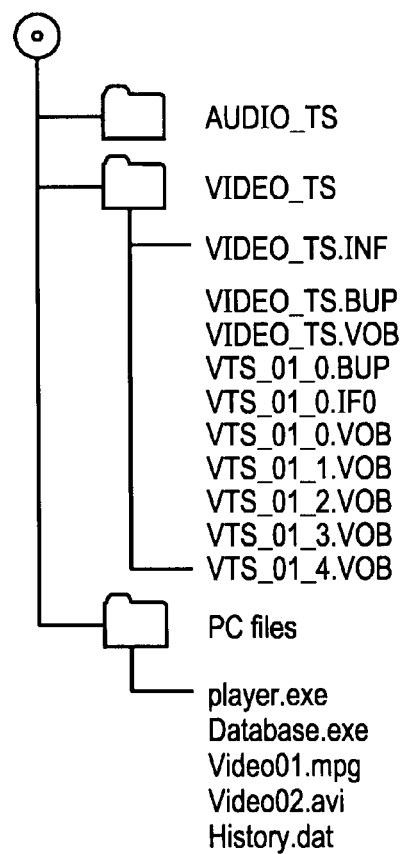
FIG. 2A shows an example of a UDF file system (in the case of an SD format).

FIG. 2A shows an example of the UDF file system (case of the SD format). The UDF file system shown in the drawing is a file system of a directory tree structure, and three directories are generated in a layer immediately under a root directory. The moving picture application format control unit 101B converts the encoded moving picture data into a file group in conformity to the application format of DVD Video in the MPEG format to be stored in a directory "VIDEO_TS" immediately under the root directory. The file group in conformity to the application format of DVD Video is composed of a management file attached with an extension "IF" and a data storage file attached with an extension "VOB", and these files are managed on the UDF file system.

Figure 2B:
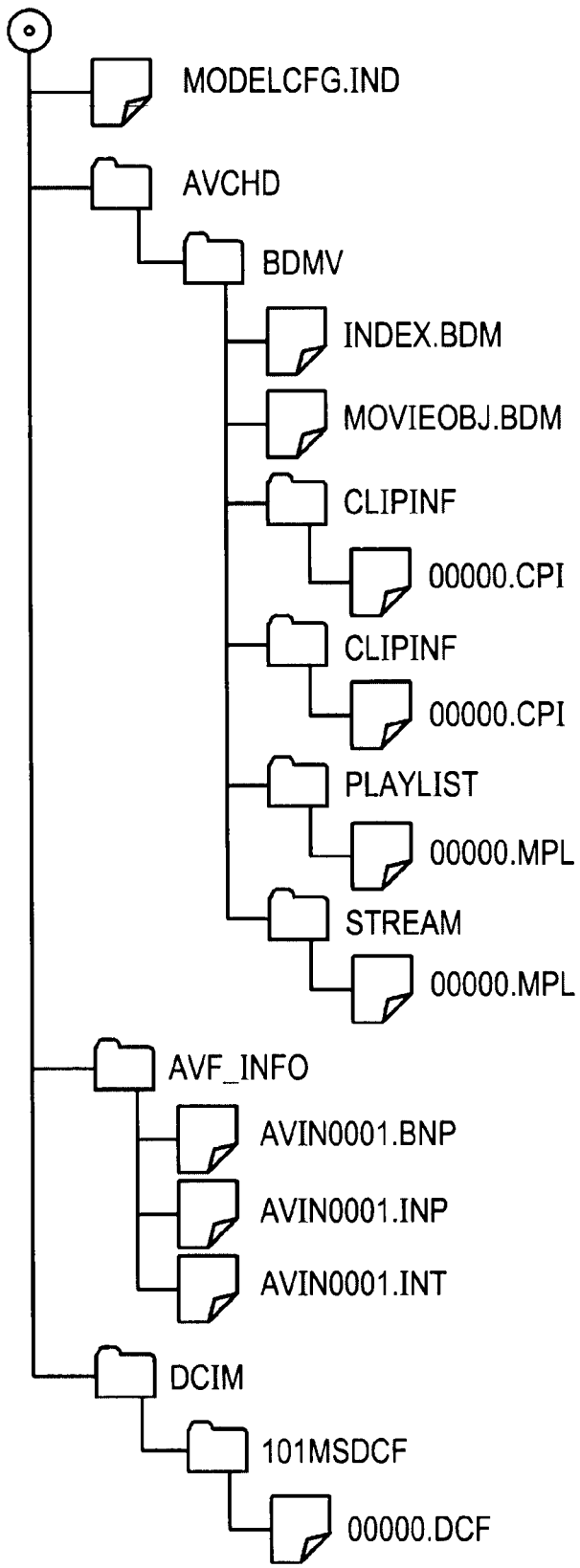
FIG. 2B shows another example of the UDF file system (in the case of an HD format).

FIG. 2B shows another example of the UDF file system (case of the HD format). A MODELCFG.IND file immediately under the root directory is a vendor inherit definition file and an information file defined by a manufacturer. Also, in the layer immediately under the root directory, three folders called AVCHD, AVF_INF, and DCIM are generated. In the AVCHD directory, a BDMV folder is further provided, and in the BDMV folder, a folder and file group defined by a moving picture video record application format is recorded. INDEX.BDM is an index file and is a file for registering and managing moving picture chapters. MOVIEOBJ.BDM is a file decided by an application and is a file for registering and managing moving picture chapters. In a CLIPINF folder, a click information file (a file for managing an access to a moving picture chapter inner stream) is stored. In a PLAYLIST folder, a playlist file (a file for managing an access to the moving picture chapter for each content) is stored. In a STREAM folder, a moving picture stream file is stored.

According to the present embodiment, face detection position information detected by the face detection control unit 102A is dispersed into a picture drawn by the moving picture stream to be recoded as the attribute information of the GOP. In an AVF_INF folder, category group registration information for supporting a user operation and a file group for managing preference information are stored. In a DCIM folder, a folder defined by a still image record application format and a still image pickup file group are stored.

Figure 3:
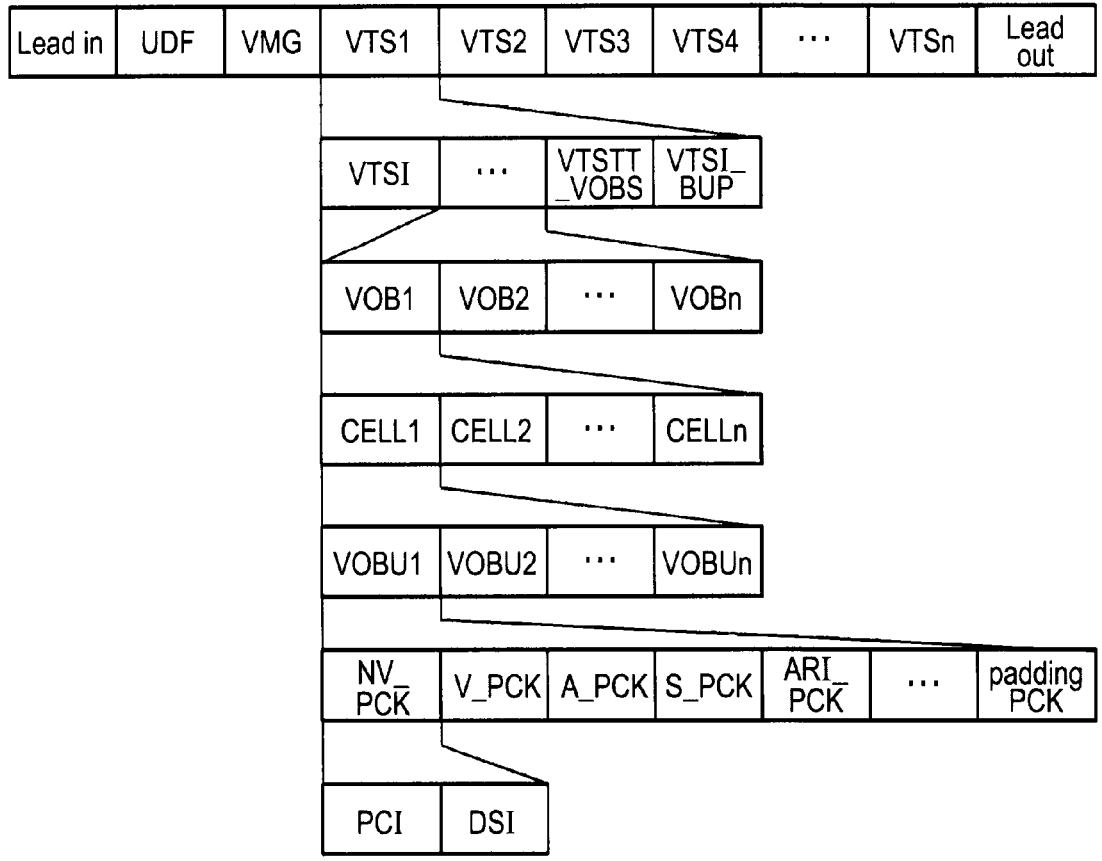
FIG. 3 shows a data structure of DVD Video.

FIG. 3 shows a data structure of DVD Video. The optical disc has a logical address arrangement heading from the radius center towards the edge. At the lead-in of this logical address arrangement, management information of UDF is recorded. In VMG, management information for the entire disc is written. In VTS1 to VTSn, one title is stored. The individual VTS is composed of VTSI and VTSTT_VOBS. In VTSI, management information for each VTS is written, and in VSTT_YOBS, the video main body is stored.

VSTT_VOBS is a set of VOB (VOB1 ... VOBn). One VOB is composed of 255 or smaller number of CELL (RUV). CELL is composed of a plurality of VOBU. The size of VOBU depends on a reproduction time. The reproduction time for each VOBU is 0 4 to 1.0 second. According to the present embodiment, 1 VOBU is set as 1 GOP (0.5 seconds). The reproduction time of last VOBU is exceptionally 1.2 seconds.

VOBU is composed of NV_PCK, V_PCK, A_PCK, and S_PCK, and ARI_PCK. NV_PCK is composed of PCI for storing management information related to the reproduction display and DSI for storing management information related to the access. V_PCK stores MPEG video data, A_PCK stores MPEG audio data, and S_PCK stores MPEG sub picture data. NV_PCK, V_PCK, A_PCK, and S_PCK are attached with moving picture reproduction time management information, and the video, the audio, and the sub picture are reproduced in synchronization. Also, in ARI_PCK, the center position coordinate of the detected face of the subject on the screen, that is, the face detection position information is stored, which is utilized for the processing on the lateral shake correction of the face at the time of the reproduction, but a detail of this point will be described in the following explanation. NV-PCK, V_PCK, A, S_PCK, and ARI_PCK constituting VOBU are all 2K bytes. These files are created by the moving picture application format control unit 101B.

Subsequently, a file group generation processing in the moving picture application format control unit 101B will be described.

The moving picture application format control unit 101B generates, first, V_PCK, A_PCK, and S_PCK. The moving picture application format control unit 101B subjects the input MPEG moving picture data to a multiplexing separation into MPEG video data, MPEG audio data, and MPEG sub picture data and stores the respective data in V_PCK, A_PCK, and S_PCK each having 2K bytes. Also, the moving picture application format control unit 101B stores the face detection position information detected by the face detection control unit 102A in ARI_PCK. The moving picture application format control unit 101B updates relevant VOBU_TBL each time these packets are generated. VOBU_TBL accumulates management information for the packets.

Then, the moving picture application format control unit 101B generates NV_PCK or RDI_PCK from VOBU_TBL and adds the generated NV_PCK to the heading of V_PCK, A_PCK, and S_PCK to generate VOBU.

Furthermore, the moving picture application format control unit 101B collects up VOBUs to generate one CELL. The moving picture application format control unit 101B updates VTS_TBL each time CELL is generated. VTS_TBL constitutes PGC (Program Chain).

Each CELL is assigned with a unique ID number. PGC specifies a reproduction order of the CELL. One in which CELLs having one or more consecutive numbers in PCG are collected up can be defined as one program. Also, One in which programs having one or more consecutive numbers in PCG are collected up can be defined as one VOB. VOB is comparable to "chapter" which is a unit where the user accesses the video stream (the user can instructs start and stop of the reproduction for each chapter).

The moving picture application format control unit 101B collects up a plurality of VOBs to generate a file for storing VOBU. In the format example shown in FIG. 2A, a file named "VTS_01_*.VOB" (* is a number) is the file for storing VOBU.

The moving picture application format control unit 101B creates VTSI including VTS_TBL and generates a file for storing VTSI. In the format example shown in FIG. 2A, "VTS_01_*.IFO" is the file for storing VTSI. The moving picture application format control unit 101B generates, finally, a file for storing VMG where the overall management information is collected up. In the format example shown in FIG. 2A, VIDEO_TS.IFO is the file for storing VMG.

In the image pickup record reproduction apparatus 100 according to the present embodiment, when the picked up video stream is input via the video audio input output interface 102 from the digital video camera, the face detection control unit 102A outputs the center position coordinate of the face of the subject detected from the video stream as the face detection position information in units of 0.5-second GOP. Then, when the moving picture codec unit 103B performs an encoding processing on the video data, the stream attribute information (ARI_PCK) is set the face detection position information is set in where the creation is instructed by the moving picture application format control unit 101B to be recoded in the flash memory drive 104 or the external drive 105.

Also, in a case where reading of the video stream recorded in the flash memory drive 104 or the external drive 105 is performed, when the decoding processing on the video stream is performed by the moving picture codec unit 103B, the moving picture application format control unit 101B also instructs obtaining of the face detection position information from the relevant stream attribute information (ARI_PCK). Then, at the time of the image expansion reproduction, on the basis of the face detection position information, the correction on the lateral position of the face can be performed so that the face of the subject is at the center of the read reproduction video. As a result, even in a case where the reproduction video is viewed by the large screen television set or the like, it is possible to prevent the user from developing the video sickness.

It should be noted that also in a time prior to the present application, a technology for face detection from the pickup up video exists and, for example, the face detection is generally performed in the camera control unit. However, the presence or absence of the face existence is merely attached and utilized as the chapter attribute information for the moving picture reproduction caption screen, and one utilized for the position correction of the face (correction of the face shake) in the reproduction video by the baseband video processing does not exist.

FIG. 4 shows a state in which a reproduction video expansion and a reproduction face lateral shake correction control are performed by utilizing the face detection position information. In the same drawing, an example is shown in which in particular a left and right correction of the face position of the subject is performed. A reason for performing the left and right correction of the face position is that as the visual following of the human being follows left and right, the lateral shake of the face strongly provides a false sense to the viewer to feel the left and right shake to be sick, and by preferably removing the lateral shake by the left and right correction, it is possible to eliminate the uncomfortable feeling of the viewer.

At the time of the reproduction start, an image fine quality mode and an image aspect mode are obtained. An offset of the face detection position information with respect to the screen center position varies in accordance with whether the mode is a 1920/1080 of HD, wide/normal of SD (in the recording, uniformly, 720 pixels).

Figure 4A:
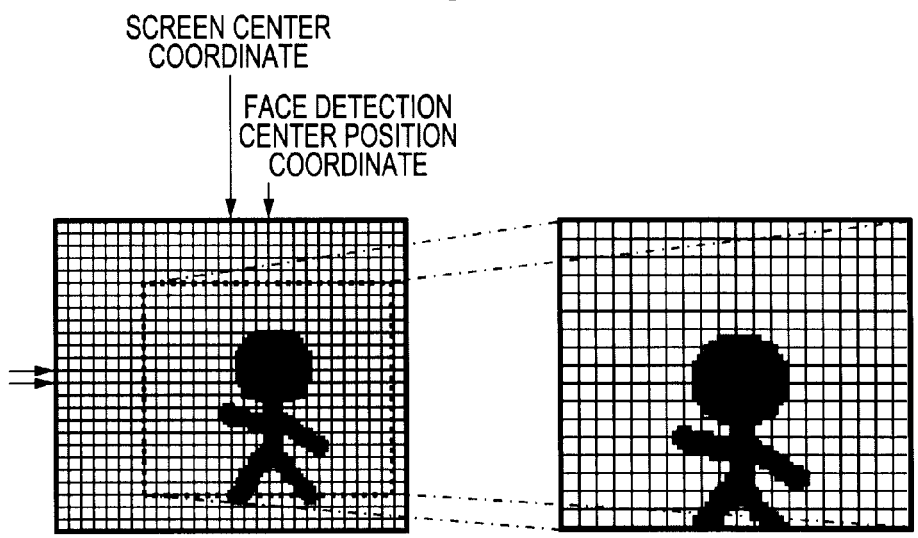
FIG. 4A shows a state in which an image expansion correction at a right shift position of a person is performed.

FIG. 4A shows a state in which an image expansion correction on at the right shift position of the person is performed. In a case where the face of the original image at the time of the reproduction is offset to the right position, the detection face center position is offset to the right with respect to the screen center position, and by removing this offset and also by subjecting the reproduction image to the expansion processing at a predetermined magnification ratio through the baseband video processing while setting the face detection center position as the center, the lateral shake of the person is corrected.

Figure 4B:
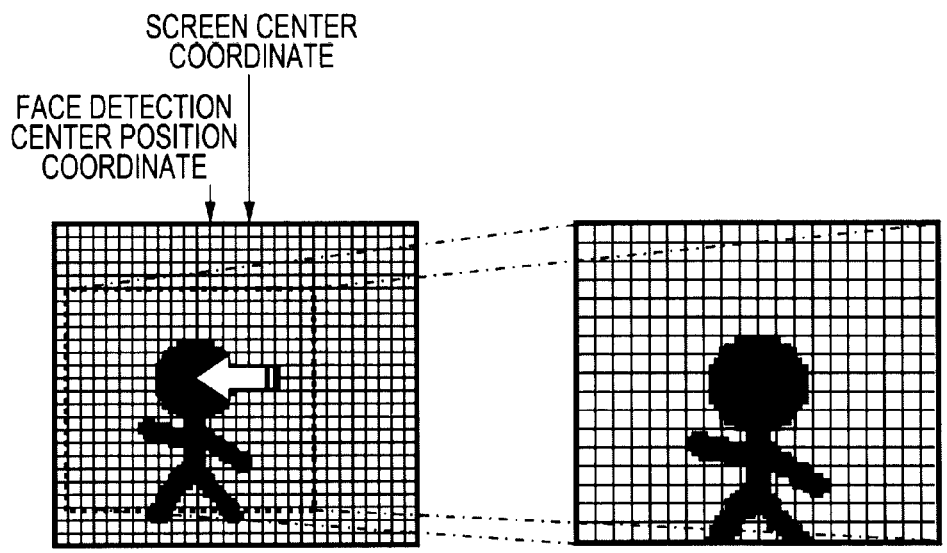
FIG. 4B shows a state in which an image expansion correction at a left shift position of the person is performed.

Also, FIG. 4B shows a state in which an image expansion correction on at the left shift position of the person is performed. In a case where the face of the original image at the time of the reproduction is offset to the left position, the face detection center position is offset to the left with respect to the screen center position, and similarly, by removing this offset and also by subjecting the reproduction image to the expansion processing at a predetermined magnification ratio through the baseband video processing while setting the face detection center position as the center, the lateral shake of the person is corrected.

It should be noted that as a body of the person is vertically long, and in the case of a head and shoulder shot or the like, the entire body of the subject is not necessarily included in the screen regularly, it is difficult to perform the vertical shake correction in some cases. A method is conceivable in which, as described above, the lateral shake is corrected at the face detection center position, and the vertical shake is corrected at the background center position. (When a face of the subject is picked up, cutting off of a contour is avoided as the face is out from the screen. In contrast to this, when a human body is picked up, as the image pickup of the human body is often performed by the head and shoulder shot and a head shot including the face, the shake in the vertical direction of the human body cannot be seen by the contour of the entire human body, the vertical size, and the shift of the human figure center.)

FIG. 5 shows a state where a record write control on the face center coordinate information onto media is performed.

Figure 5A:
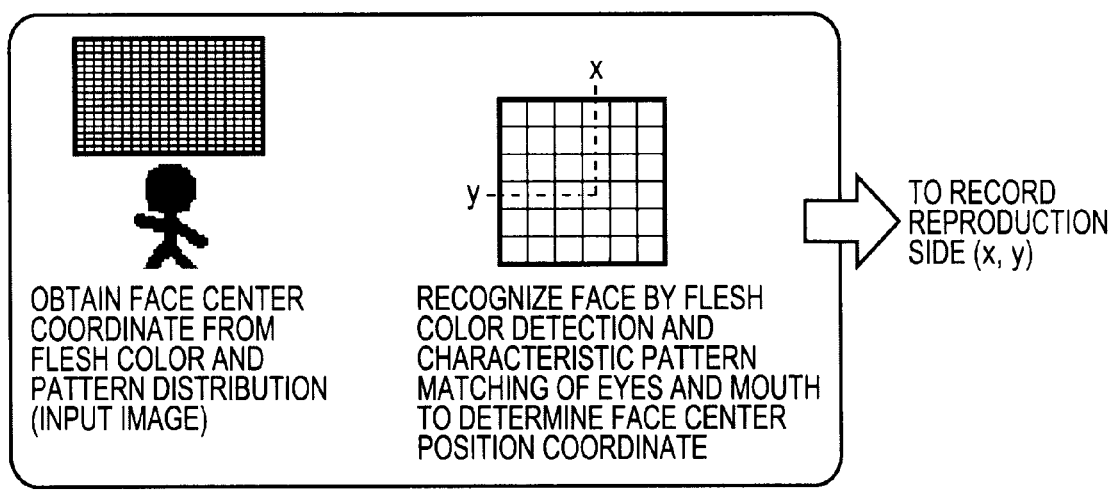
FIG. 5A shows a state in which a face center position coordinate is output through a matching between a human face shake distribution and a pattern of face parts such as eyes and a mouth.

As shown in FIG. 5A, when the video stream is input via the video audio input output interface 102 from the digital video camera or the like, if the center position coordinate of the detected face is detected through the flesh color detection and the matching between the human face shake distribution and the pattern of face parts such as the eyes and the mouth, the face detection control unit 102A outputs this as the face detection position information to the moving picture codec unit 103B in the later stage.

In the moving picture codec unit 103B, encoding on the moving picture stream data at the time of the recording and data decoding at the time of the reproduction are performed, but according to the present embodiment, while the face detection position information is used as the attribute information of the GOP, a record reproduction control is performed.

Figure 5B:
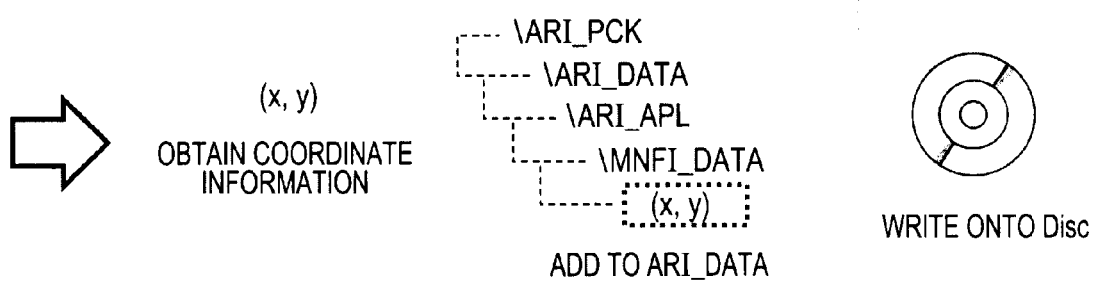
FIG. 5B shows a state in which face detection position information is recorded as attribute information on a stream.

FIG. 5B shows a state of the record reproduction control. User data such as camera image pickup information data at the time of camera image pickup is recorded in the moving picture stream as ARI information (ARI is an abbreviation of Additional Recording Information). The center position coordinate of the detected face obtained from the face detection control unit 102A is one of expansion data of the camera image pickup information in the ARI information. Then, when 1 GOP for 0.5 seconds is created as record 1 VOBU, the face detection position information including a face detection flag and center position coordinate data of the detected face are added to the VOBU attribute data (see FIG. 3) and recorded on the recording medium such as the disc.

FIG. 6 illustrates a control of the face shake correction while the face detection position information data is obtained at the time of the moving picture data.

Figure 6A:
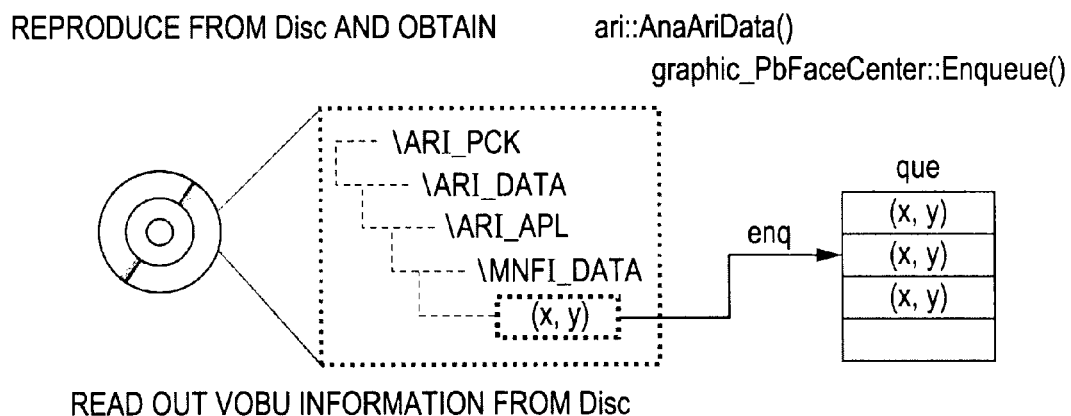
FIG. 6A is a diagram for describing a reproduction stream control for reading out the attribute information which is reproduced from a disc for each VOBU (GOP).

FIG. 6A illustrates a reproduction stream control for reproducing from the disc and reading out the attribute information for each VOBU (GOP). As shown in FIG. 6A, the ARI data is recorded and exists in the VOBU information, and reading is performed at the time of the moving picture reproduction. For example, the name is set as "MNFI data". Each time the ARI data attached to VOBU is read, the face detection position information in the MNFI data is accumulated in a ring buffer for the reproduction face position correction. The size of the ring buffer is for 128 VOBU.

Herein, by a processing of collectively reading out the data amounts falling in the buffer size called RUV, a plurality of VOBUs are collectively read out in the continuous stream. The size thereof in a case where the subject at the time of the image pickup is moved is the buffer size, and even in other cases, the reading is limited with the maximum number for 128 VOBUs on the ground of the reproduction search control.

Figure 6B:
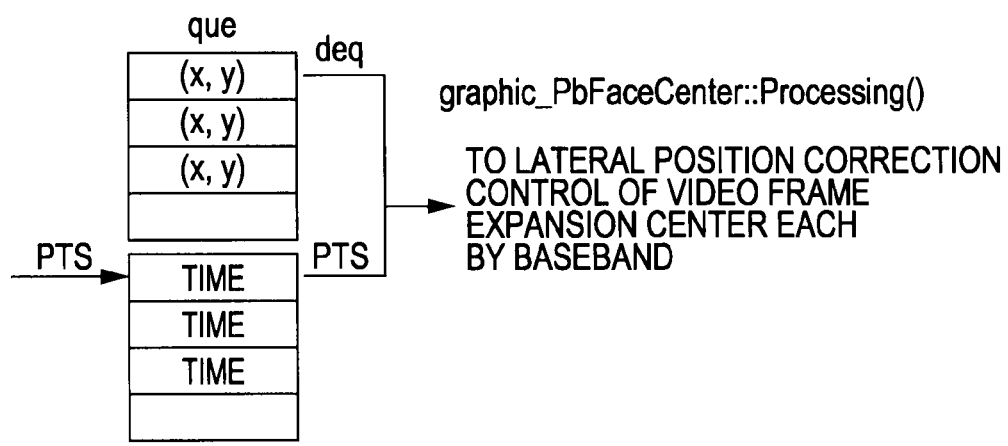
FIG. 6B shows the face detection center coordinate information data set read and piled up on a ring buffer and corresponding PTS list information data corresponding to lead-in positions of the respective GOPs.

FIG. 6B shows the face detection position information set read and piled up on a ring buffer and corresponding PTS (Presentation Time Stamp) list information data corresponding to lead-in positions of the respective GOPs. Together with time information on list information data of the PTS corresponding to the lead-in position of the GOP, the corresponding face detection position information is subjected to the baseband video processing. In the baseband video processing, by reproducing the image with an expansion zoom at a predetermined specified magnification ratio while the face detection position information is set as the center, it is possible to performs the processing for correcting the lateral shake of the reproduction image for each frame.

Figure 7:
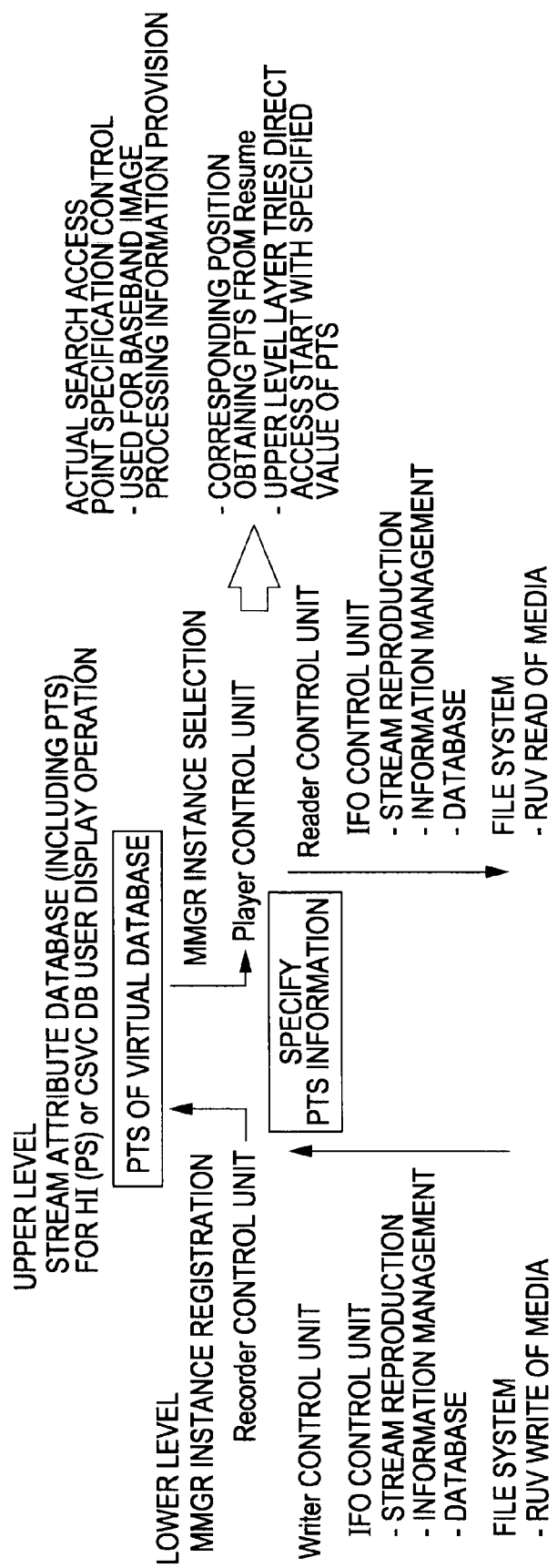
FIG. 7 is a diagram for describing a read sequence of position information at the time of reproduction.

FIG. 7 illustrates a read sequence of position information at the time of the reproduction. It should be however noted that "upper level" in the same drawing is comparable to a software layer assigned to an interface with a user operation for mainly dealing with the user operation, start and end of recording, reproduction, and editing, specification of an editing point, and a number and a time of the chapter contents. Also, "lower level" is comparable to a software layer for actually controlling the access to the recording media and controlling encoding and decoding processings on the video codec, data buffering of data following a recording format and writing into the recording media, and data reading and buffering from the recording media following the recording format and sending out to the video codec.

PTS is read from RUV read from the system file via the stream reproduction database. In the processing in the upper level layer, virtually, at the time of the recording, database is held in some cases in a time discrete manner. However, therein, search information which can cope with a variable length stream of the video audio does not exist, and the upper level is estimated by an estimated computation, and an approximate time position can only be specified.

A method of creating database of the PTS appropriately specified by the upper level is to register PTS received from AVCon (comparable to a control block for controlling the encoding decoding hardware together with the time information in the moving picture codec unit 103B/103C during the recording) in the case of a face index function (Face) (in the encoding decoding control on the moving picture, as time information such as a decode time stamp and a reproduction display time stamp (PTS) needs to be necessarily matched with each other, it is possible to obtain the time information therefrom). The face index mentioned herein has a function for an index registration of a thumbnail functioning as a face index when a face is newly detected in the moving picture image pickup, and at the time of the reproduction, and a plurality of thumbnails functioning as the face index are arranged and displayed.

On the reproduction control side, the PTS estimation value is received, and the nearby RUV including it is accessed to be accumulated in the reproduction reading buffer, and at the same time, the real PTS of the relevant VOBU number is obtained and obtained as the position information. If the reproduction in the previous time remains stopped, as resume information is temporarily held on a volatile type memory, the precise reproduction is realized from the position. In a case where the resume information does not exist, a control is performed in which by receiving the virtual PTS time position specified at the upper level, the surrounding data is collectively read to start. Then, one close to the specified PTS (VOBU) in the surrounding is found to start the reproduction.

The "one close to the specified PTS" mentioned herein means that the upper layer software assigned to the interface with the user operation specifies the reproduction position by the time, and in contrast, in the moving picture codec unit 103B/103C and the moving picture application format control unit 101B/101C at the lower level, the PTS information included in the encoded stream read out from the media into the buffer is taken out, and the PTS information closest to the reproduction specification time specified in the upper level layer is selected (because the upper level layer is not for directly controlling the encoded stream recorded in the media and cannot directly specify the PTS in the stream). When the reproduction time is specified in the upper level layer, first, a computation is performed in an abstract manner from Duration held in the upper level to specify a supposed PTS. When the supposed PTS is received from the upper level layer, the lower level layer reads out MAVI (M2PS), NV_PCK (DVD), and MD_PCK (AVCHD) to pick up the VOBU close to the PTS received from the upper level and specified for application.

According to the present embodiment too, a control is performed in which the PTS time information of the frame specified by the reproduction and the corresponding face detection position information are dealt with as a set.

Figure 8A:
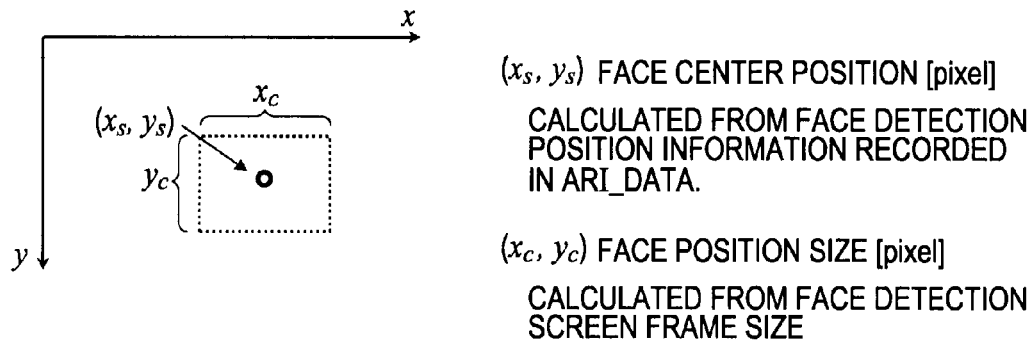
FIG. 8 is a diagram for describing a processing for converting a lateral shake correction parameter of the face from the reproduction face coordinate.

A face detection frame on the reproduction screen can be represented, as shown in FIG. 8A, by the face center position coordinate $(x_s, y_s)$ and the face size $(x_c, y_c)$ by using an xy screen coordinate system (it should be however noted that the coordinate value is represented in the pixel unit). The face center position $(x_s, y_s)$ is calculated from the face detection position information recorded in ARI DATA, and the face size $(x_c, y_c)$ can be calculated from the face detection screen frame size. The face center position ($x_s$, $y_s$) and the face size ($x_c$, $y_c$) are parameters necessary for the reproduction face shake correction.

Figure 8B:
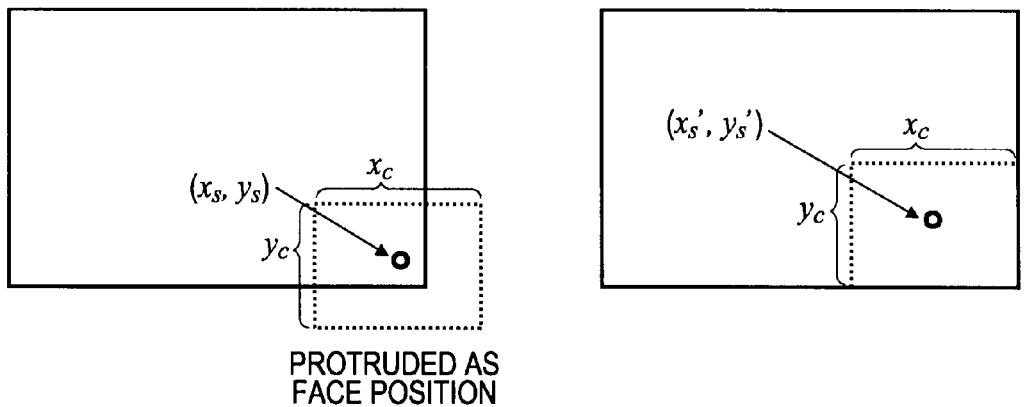

When the moving picture is subjected to the expansion reproduction processing, the expansion cannot be performed simply in some cases while the face center position coordinate is set as the center, and the correction processing is required. For example, as shown in the left of FIG. 8B, the case is that when the expansion is performed while the face center position coordinate is set as the center, a part of the face detection frame is out from the display range of the reproduction screen after the screen expansion. In such a case, a control is performed by providing a left and right width limitation for shift correction to the position where the face detection frame is fit into a side within the screen so that the abnormal reproduction face shake correction is prevented. As shown in the right of FIG. 8B, a processing for correcting the face center position coordinate is performed in which the respective sides of the face detection frame are modified to positions contacting the respective sides of the display range on the expansion reproduction screen in the display range of the expansion reproduction screen, and the face detection frame is fit into the display range of the expansion reproduction screen. The face detection frame is assumed to be a frame including the entire face. Therefore, if the face frame coordinate is fit into the range of the expansion reproduction screen, the entire face within the face frame is also fit into the expansion reproduction screen, a preferable display is performed without cutting off the face.

According to the present embodiment, at the time of the video reproduction, the read-ahead is performed on the face detection position information recorded as the attribute information to be subjected to interpolation average in a time continuous manner, and the control is performed on the reproduction face shake correction of the video. If the recorded face detection position information is read at the time of the reproduction, the temporally long read-ahead is realized. Therefore, for a period of the lateral coordinate position change data along the time elapse is long, the processing can be performed by reading, so that the lateral shake correction of the face for a satisfactory accuracy is realized.

Figure 9A:
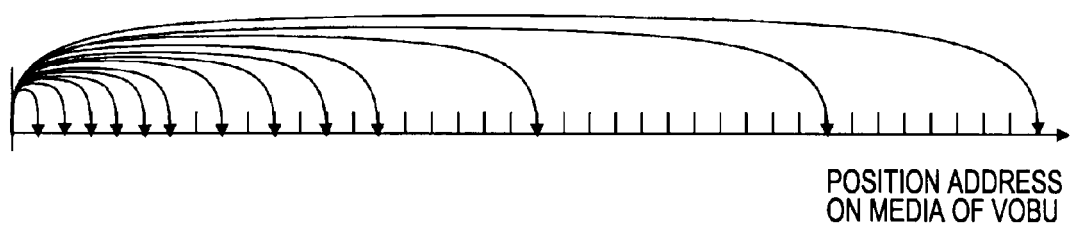
FIG. 9A is a diagram for describing a control in which search information held as the VOBU attribute information specifies a position address on media for a search for a stream.

FIG. 9A illustrates a control in which the search information held as the VOBU attribute information indicates a position address on the media for a stream search. The search information indicates VOBU and the address position on the media and is obtained by RUV reading. In order to cue the VOBU lead-in specified by performing the position search for the GOP (1 GOP, 2 GOP, or the like can also be used) included in VOBU, the search information is used. It should be however noted that even in a case where the bit rate after the encoding of the moving picture stream is low and the data size is smaller than the buffer memory capacity size, the search information is not held up to infinity, and as the VOBU, the search can be performed for 128 VOBUs at maximum, the maximum number of the search information table of the VOBU is held. 1 RUV Max is 128 to 120 VOBUs, or 20 MB (it should be however noted that when 20 MB is used for the RUV buffer size). In the normal moving picture pickup, as the subject video includes detailed part information and also movements exist, the size is not so compressed even after the encoding, and 128 VOBUs are not reached while the upper limit of the buffer size is not reached.

The video audio attribute information table of the VOBU is constructed on the basis of the search information while a stream attribute of the VOBU video audio stream, time counter information, and the like are read by the reproduction control unit. Herein, the face detection position information included in the ARI data is also collectively obtained for each VOBU.

The VOBU data is read from the data from the reproduction start to be accumulated in the data buffer, but in time, the VOBU data is consumed in the reproduction. When the VOBU data in the data buffer runs low (for example, the remaining is about 10 VOBU or smaller), as shown in FIG. 9B, a reading update request is generated, and the next RUV data is read and accumulated. In the same drawing, the description is given while the upper limit of the data buffer is set as 128 VOBU or 18 MB.

Figure 10:
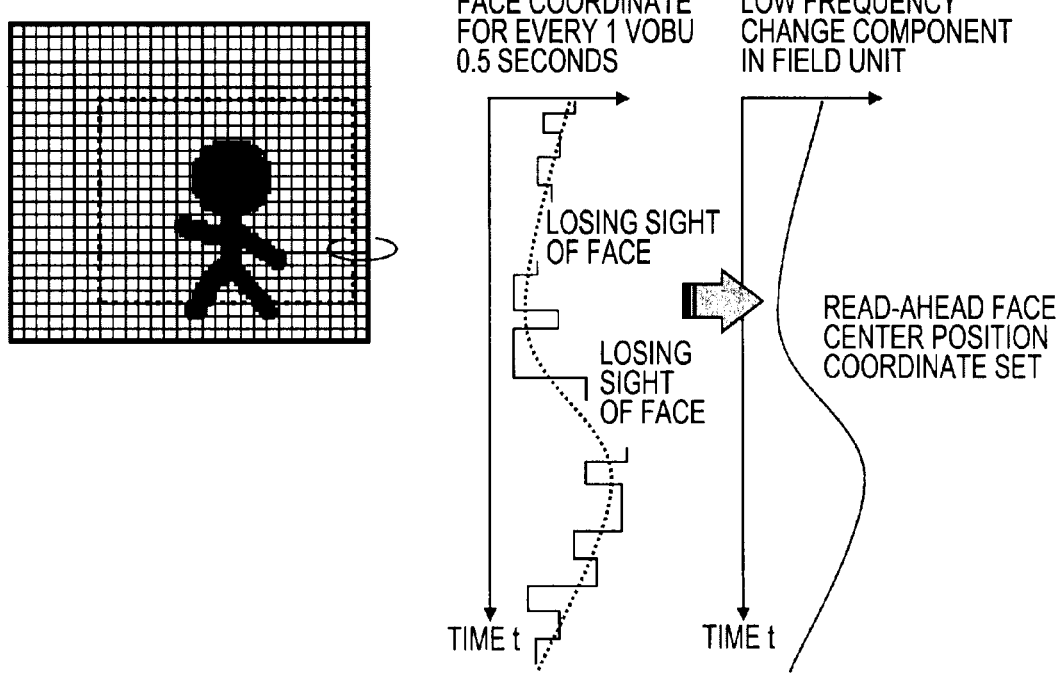
FIG. 10 is a diagram for describing a control for taking a low frequency lateral position change at a frame time elapse from the face center position coordinate for correction.

FIG. 10 illustrates a control for taking a low frequency lateral position change at a frame time elapse from the face center position coordinate for correction. At the time of the reproduction start, up to 128 VOBUs are previously read for the preparation of the search to be accumulated in the data buffer. That is, as the reproduction is performed after the data is previously read into the buffer, the temporal change of the face center position coordinate included in the data temporally previously read can also be predicted in advance.

The face detection position information is obtained from the ARI data as the attribute information together with VOBU. For the face detection position information in the ARI data, in actuality, discontinuous position data is obtained from the disc media with respect to the frame for every 0.5 seconds. Also, as the subject is shifted to be out of the screen area, the face is lost, and a period during which the face is not detected may also exist. As a large number of VOBUs are read ahead into the buffer in the RUV unit, smoothing is performed while a frame interpolation, an interpolation for a section where the face detection position information does not exist, and a reliable future predicted position as a coordinate change on the discontinuous screen of the face detection position information in units of 0.5 seconds (that is, the subject the center position coordinate of the detected face) are obtained, so that the efficient lateral shake correction without the sense of visual discomfort in anticipation of the future predicted position in the time manner is realized.

Figure 11A:
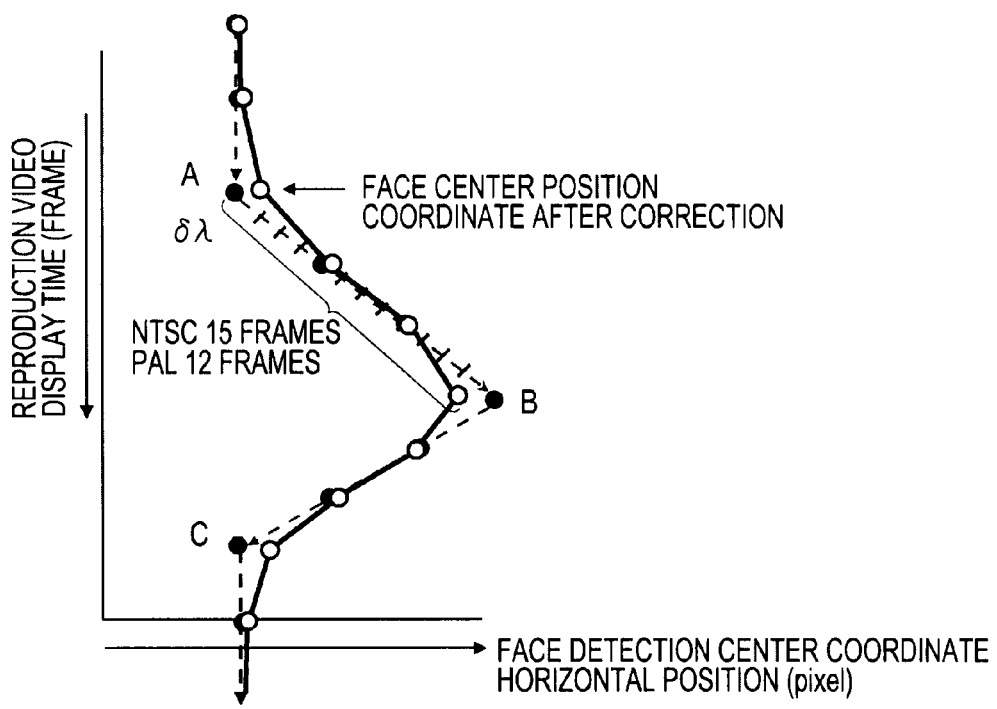
FIG. 11A is a diagram for describing an interpolation calculation method for the face center position coordinate for each field.

When the detection face center position of the subject is shifted for each GOP, the jagged lateral shake correction of the face is performed on the reproduction screen. In view of the above, the coordinate for each field is subjected to the interpolation calculation to increase the coordinate information amount to smoothly follow. FIG. 11 illustrates an interpolation calculation method for the face center position coordinate for each field. In FIG. 11A, the vertical axis represents a time axis of the reproduction video display time in the video frame unit, and the lateral axis represents a lateral position coordinate at the center of the detection face on the corresponding screen. The face center position of the expansion reproduction is obtained for each VOBU. In the baseband video processing, the horizontal shift position of the face detection position information read from the respective VOBUs is subjected to the time smoothing to be set as the lateral center position of the face subjected to the expansion reproduction.

From 2 points of the face center coordinates for each GOP (0.5 seconds), a shift amount for 1 field (NT=15, PAL=12) is calculated. Then, a range of the maximum shift limitation amount is provided, and in a limitation of the movable range of the face center coordinate, the shift amount in the face center position coordinate in the moving average computation dividable for each field is calculated.

In the example shown in FIG. 11A, the face center position of the first GOP is set as a point A, the face center position of the next GOP is set as a point B, and the face center position of the third GOP is set as a point C, which are face detection positions in the ARI data belonging to the VOBU respectively read every 0.5 seconds. Then, a gap between the respective points is a video frame composed of a display time axis having 15 frames in NTSC and 12 frames in PAL.

Herein, a calculation method of assigning coordinates to the respective frame times while keeping the A point, the B point, and the C point as they are in a linear straight line manner is simple, but in the correction operation, the correction amount is decided discontinuously for every 0.5 seconds visually in the screen lateral direction for the correction, the smooth lateral shake correction is not realized, which is discontented.

In contrast to this, for example, 0.5 seconds dividable by the number of the fields in NTSC or PAL is equally divided into 3, two points are provided the time intervals, and the weighting coefficient attached time anteroposterior bidirectional moving average therefor is obtained to performs smoothing, so that the lateral position correction is realized smoothly in the frame unit instead of the GOP unit or the VOBU time unit. A shift amount $\delta\lambda$ for each one field is calculated from the following expression.
[Expression 1]

$$X_A + \delta\lambda = \frac{K_1 X_A + K_2 X_B + K_3 X_C + \ldots + K_{j-1} X_{N-1} + K_j X_N}{K_{AVE} N_{GOP1}} \quad \text{Expression 1]}$$

In the above expression, $N_{GOP}$ is the number of frames in the GOP (15 in NTSC, and 12 in PAL), and $K_{AVE}$ is a normalization coefficient of the weighting addition average.

The face center coordinate position for each field is obtained from A to B for every $\delta\bullet$ to create a table shown in FIG. 11B.

Through the expansion processing display at the coordinate center by providing this information at the time of the baseband reproduction video expansion processing, the lateral shake of the face, and the vertical shake are effectively corrected.

FIG. 12 is a sequence diagram showing a procedure for writing face detection center information in ARI data on the operation of performing record of the video stream.

At the time of recording of the video stream, a state is established in which the recording is started by the recording control at the upper level. At this time, the codec unit 103 encoding by controlling the data buffer issues a camera information update request to the upper level each time 0.5-second VOBU is created.

Through the recording attribute control in response to this request, the camera image pickup information is separately obtained from the camera block, the VOBU attribute information of the video stream accompanying the image pickup such as the time and the video signal is provided to the codec unit 103, and encoding of the video stream is performed in the codec unit 103.

Subsequently, for writing the ARI information, the camera data is provided, and the ARI camera data is created and updated.

On the sequence diagram shown in FIG. 12, an operation is illustrated in which in a case where one provided as the image pickup data from the camera is not provided in a desirable format to the record reproduction, through the record control, a processing of setting the face position coordinate is substituted, and the information update operation is performed for each VOBU in recording for adding the ARI data as the camera image pickup attribute information to the picked up video stream as the attribute information.

Figure 13:
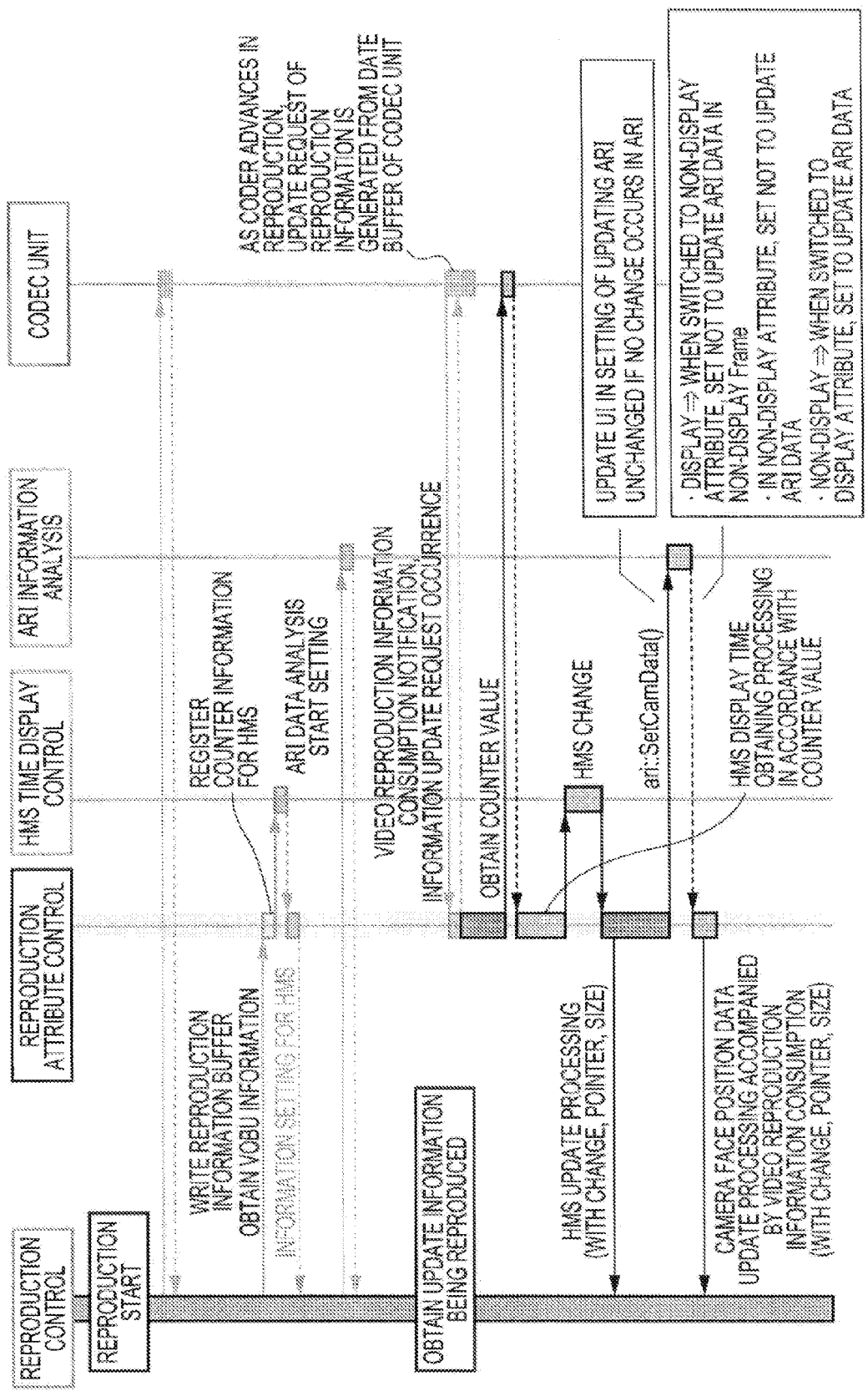
FIG. 13 is a sequence diagram showing a procedure of reading out the face detection center information from the ARI data on the operation of reproducing the video stream.

FIG. 13 is a sequence diagram showing a procedure of reading out the face detection center information from the ARI data on the operation of reproducing the video stream.

At the time of the video stream reproduction start, after performing setting of the reproduction speed (normal reproduction is at x1 speed), setting of HD (1920/1080) or SD (720/712/352 or the like) of the video system and a type depending on a difference in the lateral pixel size, the accumulation upper limit value and the lower limit value of the stream buffer for accumulating RUV as the moving picture reproduction attribute information, and the number of stages of the list table of the stream search address, setting of the number of stages of the decode information list and the upper limit and the lower limit, and setting of the number of stages of the video audio reproduction information table and the upper limit and the lower limit, the reproduction decode reproduction display of the video stream data is started.

A series of a large number of VOBUs are collected up in the RUV unit to be read from the recording medium, time information composed of hour, minute, and second is created from the counter data to be output as time display data, and in the reproduction control of the upper level unit, a character display such as OSD (On Screen Display) or graphic display for a video output control is performed. The upper level unit mentioned herein is comparable to the software layer assigned to the user operation or the interface (described above).

Subsequently, from the list of the ARI data, the ARI information is analyzed to obtain first VOBU data.

The above is the procedure until the face detection center coordinate position included in the ARI data is obtained at the time of the video stream reproduction start.

During the reproduction of the video stream, the codec unit 103 consumes the VOBUs accumulated in its own buffer in the decode reproduction, and when the VOBU data accumulation amount is below the set lower limit, the codec unit 103 collectively reads the next RUVs from the recording medium, and also for the reproduction attribute control, provides a notification of the video reproduction information consumption and a reproduction information update request with respect to the data control unit 107.

In response to this request, as the reproduction attribute control, the VOBU counter data currently reproduced from the codec unit 103 is obtained, and HMS (hour, minute, and second) time values are updated as the HMS display time control to output the data values. In the reproduction control at the upper level, the HMS updated values are used as a reproduction time progression display value of the screen.

After that, the system control unit 101 analyzes the ARI information for the reproduction attribute control to set and update the ARI data. When recording of the video stream data sent via the video audio input output interface is performed, the moving picture application format control unit 101B uses the moving picture codec unit 103B and records the face center coordinate position information detected by the face detection unit 102A for each GOP as the attribute information of the GOP while being associated with the moving picture application time in the ARI. Herein, if the ARI has a value change and needs update, the update processing enters. Also, the ARI information update processing is not necessary at all and is matched with the previous VOBU, it stands by until the next update occasion while keeping the value as it is without update.

If the camera image pickup information data has even a partial information update, update of the ARI data is executed. For example, in a case where the center position coordinate of the detected face is horizontally shifted and changed, the ARI data is updated with the information to be output for the reproduction control at the upper layer.

Herein, in the video audio application format control performed in the system control unit 101, a case exists in which the intermediate part deletion of the video can be performed by setting a predetermined VOBU data section as non-display through a video editing, and a processing to deal with it is required. That is, as a control for the ARI information analysis corresponding to this, in a state the reproduction stream data is shifted from the reproduction display attribute to the reproduction non-display attribute by the application format control, even when the ARI data read from the VOBU of the original video stream has a difference, it is coped with by keeping holding without performing the update control for the ARI. Also, when the display attribute of the video stream is in the display non-display attribute, the ARI data is not subjected to the update control. Furthermore, also, after the timing when shifting from the non-display section of the video stream to the display section, if a mismatch exists in the contents of the ARI data, the update is performed to output the ARI data for the reproduction control at the upper level, and the information is updated.

In the reproduction control, this information is provided for the baseband reproduction video expansion processing, and through the expansion processing display at the coordinate center (see FIG. 4), the lateral shake and the vertical shake of the screen are effectively corrected.

Figure 14:
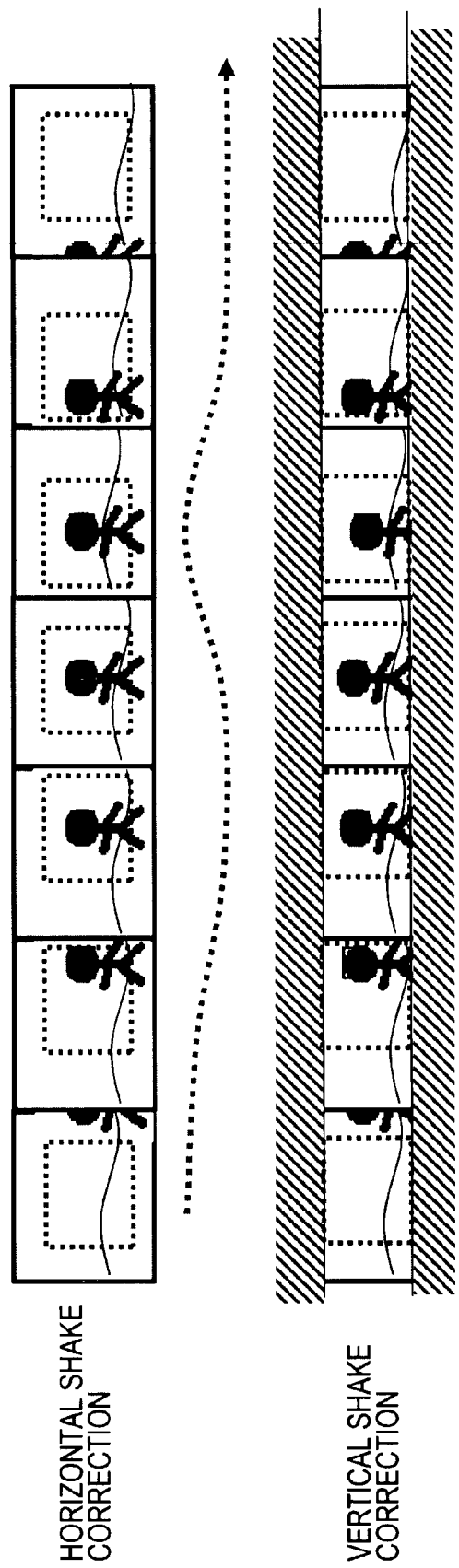
FIG. 14 shows a state in which the shake correction is performed through a combination of lateral shake information of the face and vertical shake information.

FIG. 14 shows a state in which the shake correction is performed through a combination of the lateral shake information of the face and the vertical shake information.

As already described above, the lateral shake information of the screen is obtained on the basis of the face detection position information. Also, the vertical shake information is obtained on the basis of the image position coordinate obtained from information other than the face detection position information (a subject of another type). A reason why the vertical shake information is obtained from the subject other than the face is that the face is a part of the body, and it is difficult to distinguish the up and down movement and the position thereof in some cases (described above). Also, as a visual characteristic of the human being, the lateral shake correction is desired to be performed on the face, but for the vertical shake, the correction is desired to be performed in some cases on the basis of the detection of the more gentle vertical shake in the scenery background dominating the entire screen.

FIG. 14 exemplifies a state in which the screen shake is corrected from the video stream in a case where a person moves while skipping.

At the time of the image pickup, by the subject position detection control of the camera control unit, the face detection center coordinate is obtained by way of the horizontal coordinate. At that time, the background horizontal line vertical position shake and inclination information data are obtained by way of the vertical coordinate to be recorded together with the video stream onto the recording medium.

Also, at the time of the reproduction, the lateral shake correction is applied in the screen lateral direction by way of the face detection position information, also, the vertical correction is applied in the vertical direction by way of the landscape horizontal detection position coordinate, by combining these, the baseband reproduction video expansion processing is performed, and through the expansion processing display at the coordinate center, both the lateral shake and the vertical shake are effectively corrected.

Figure 15:
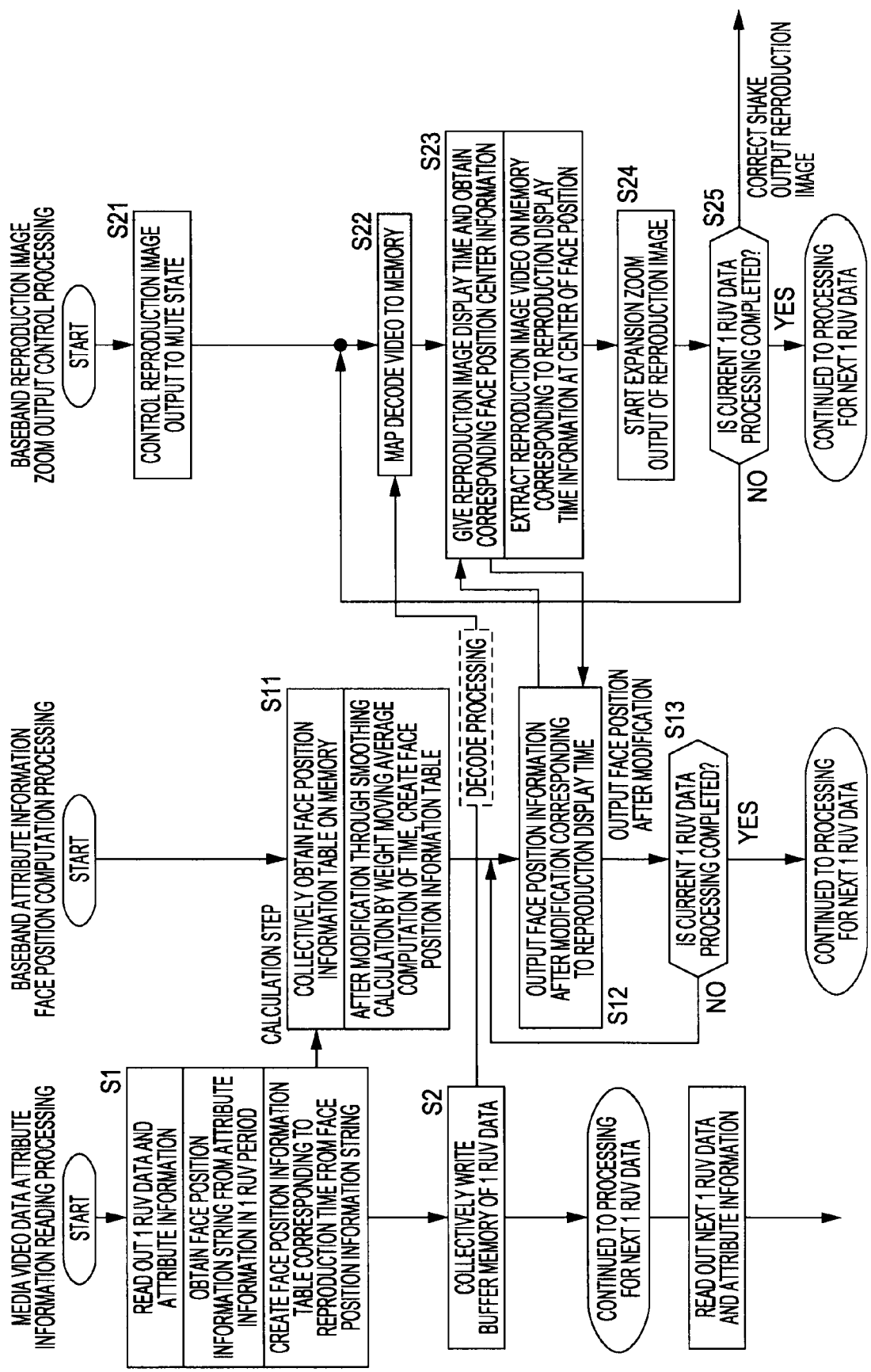
FIG. 15 is a flow chart showing a processing procedure for performing a baseband reproduction video expansion processing while a screen shake is corrected by using the face detection position information.

FIG. 15 shows a processing procedure for correcting the screen shake by using the face detection position information to perform the baseband reproduction video expansion processing in a flow chart format. At the time of the recording, together with the video stream, the attribute information including the face detection position information is also supposed to be recorded on the recording medium.

As a reading processing for the video stream data and the attribute information, first, the video stream data for 1 RUV and the corresponding attribute information are read from the recording medium. At that time, a data string of the face detection position information is obtained from the attribute information during 1 RUV period, and a face position information table in which the face detection position information corresponding to the respective frame reproduction times of the read out video stream is written is created (step S1).

Then, the data for 1 RUV is collectively written into the buffer memory (step S2).

The above processing is repeatedly executed for each RUV.

Also, among the processing on the attribute information in the baseband, as the face position computation processing, the face position information table after the modification is created where the attribute information on the face position information table accompanying the GOP of the video across the time axis is collectively read ahead as RUV composed of a plurality of GOPs on the memory, and the smoothing calculation is performed through the weight moving average computation of the time (step S11).

Then, for the face shake correction on the reproduction screen, during a period until the processing on the current 1 RUV data is completed (step S13: No), the face position information after the modification corresponding to the reproduction display time is sequentially output (step S12).

Also, the output control processing on the reproduction image in the baseband is first controlled into a mute state (step S21), but when the video stream data is subjected to the decode processing for 1 RUV accumulated in the buffer memory, this is loaded at a predetermined address position of the memory (step S22).

Then, when the reproduction image display time is provided by the PTS, and the corresponding face detection position information is obtained, the output control processing on the reproduction image in the baseband extracts the reproduction image video on the memory corresponding to the reproduction display time information by using the face position as the center (step S23), the reproduction image is output with expanded zoom, and the reproduction image on which the face shake correction is applied is output (step S24).

The above processing is repeatedly executed during a period until the processing on the current 1 RUV data is completed (step S25: No).

Figure 16:
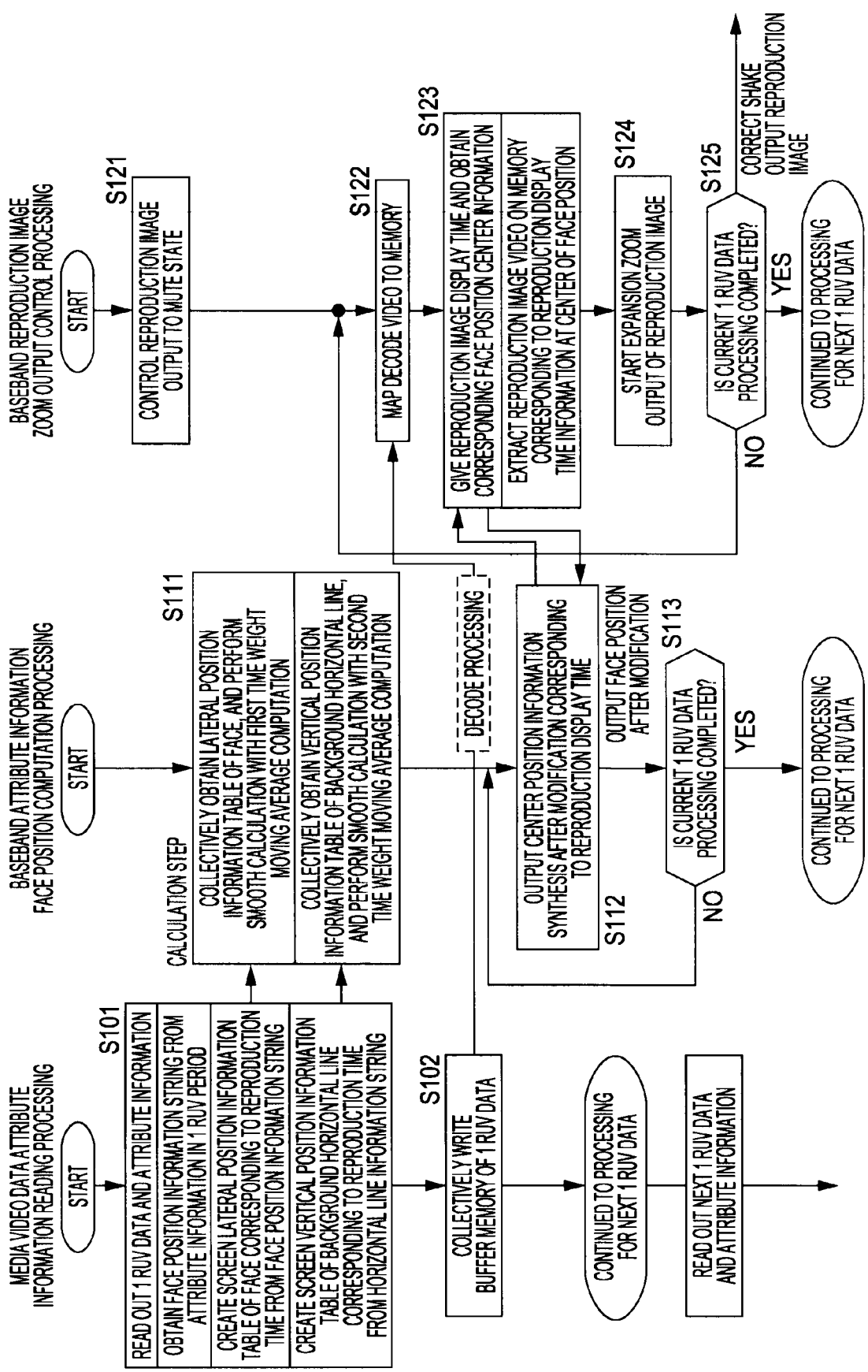
FIG. 16 is a flow chart showing a processing procedure for performing a baseband reproduction video expansion processing while a lateral shake correction is applied in a screen lateral direction by way of the face detection position information and also a vertical shake correction is applied in a vertical direction by way of the landscape horizontal detection position coordinate and by combining these.

Also, FIG. 16 shows a processing procedure for performing the baseband reproduction video expansion processing while the lateral shake correction is applied in the screen lateral direction by way of the face detection position information, and also the vertical correction is applied in the vertical direction by way of the landscape horizontal detection position coordinate by combining these in a flow chart format. At the time of the recording, together with the video stream, the attribute information including the face detection position information is also supposed to be recorded on the recording medium.

As a reading processing for the video stream data and the attribute information, first, the video stream data for 1 RUV and the corresponding attribute information are read from the recording medium. At that time, the data string of the face detection position information is obtained from the attribute information during 1 RUV period, the face position information table in which the face detection position information corresponding to the respective reproduction times of the read out video stream is described is created, and also from the data string of the horizontal line information, the screen vertical position information table of the background horizontal line corresponding to the respective reproduction times is created (step S101).

Then, the data for 1 RUV is collectively written into the buffer memory (step S2).

The above processing is repeatedly executed for each RUV.

Also, among the processing on the attribute information in the baseband, as the face position computation processing, the face position information table after the modification is created in which the above-mentioned face position information table is collectively obtained on the memory, and the smoothing calculation is performed through the weight moving average computation of the first time. Furthermore, the screen vertical position information of the background horizontal line table is collectively obtained on the memory, and the screen vertical position information table after the modification in which the smoothing calculation is performed through the weight moving average computation at the second time is created (step S111).

Then, for the face shake correction on the reproduction screen, during a period until the processing on the current 1 RUV data is completed (step S113: No), for every reproduction display time, the center position information in which the corresponding face position information after the modification and the screen vertical position information are synthesized is sequentially output (step S112).

Also, the output control processing on the reproduction image in the baseband is first controlled into the mute state (step S121), but when is subjected to the decoding processing the video stream data for 1 RUV accumulated in the buffer memory, this is mapped in the memory (step S122).

Then, the reproduction image display time is provided by the PTS, when the corresponding center position coordinate after the synthesis is obtained, the reproduction image video on the memory corresponding to the reproduction display time information is extracted to the relevant center position (step S123), the reproduction image is output with expansion zoom, and the reproduction image on which the face shake correction is applied is output (step S124).

The above processing is repeatedly executed during a period until the processing on the current 1 RUV data is completed (step S125: No).

It should be noted that the lateral shake prevention processing when the video picked up by the digital camera in the present invention is reproduced can be realized also in a mode of executing a predetermined program code on a computer other than being embodied on dedicated hardware, and such program code instructs the computer to function as read means configured to read a video stream together with attribute information from a recording medium, decode means configured to decode the read video stream, face shake correction means configured to predict face detection position information included in the attribute information and correct a face shake included in the video stream, and output means configured to output the video stream after the face shake is corrected.

Such computer program is one defining a computer program described in a computer readable format so as to realize a predetermined processing on the computer. In other words, by installing the computer program like this into the computer, a cooperative action is exercised on the computer, and it is possible to obtain an action effect similar to a video reproduction apparatus according to claim 1 of the present application.

INDUSTRIAL APPLICABILITY

In the above, with reference to the specific embodiments, the present invention has been described in detail. However, it is obvious that those skilled in the art may attain modifications and alterations of the relevant embodiments within the scope not departing from the gist of the present invention.

In the present specification, the embodiments applied to the system have been mainly described in which the video stream obtained through image pickup by the camera or the like is recorded on the recording medium with the attribute information accompanying in the moving picture format of the MPEG format, and also the reproduction output is performed from the recording medium, but the gist of the present invention is not limited to this. Even in a case where the video stream is recorded and reproduced in a moving picture format other than MPEG, it is needless to argue that the present invention can similarly be realized.

In short, the present invention has been disclosed in the form of exemplifications, and the described contents of the present specification should not be construed in a limited manner. In order to determine the gist of the present invention, the scope of the claims should be considered.

The invention claimed is:

1. A video reproduction apparatus for reproducing a video stream recorded on a recording medium together with attribute information accompanying in a predetermined moving picture format, face detection position information composed of a center position coordinate of a face detected from the video stream as the attribute information being recorded on the recording medium, the video reproduction apparatus being characterized by comprising:
  read means configured to read the recorded video stream together with the attribute information from the recording medium;
  decode means configured to decode the read video stream;
  face shake correction means configured to predict a screen shift amount on the basis of the face detection position information included in the attribute information and correct a face shake included in the video stream; and
  output means configured to output video stream after the face shake is corrected.

2. The video reproduction apparatus according to claim 1, characterized in that
  the video stream is subjected to encoding where a screen group of a plurality of frames is set as a unit, and also face detection position information regarding a lead-in frame of each screen group is attached to the video stream as the attribute information and recorded on the recording medium,
  that the read means reads ahead the video stream for a plurality of screen groups and the face detection position information at the time of video reproduction, and
  that the face shake correction means predicts the screen shift amount by subjecting face detection positions to interpolation average in a time continuous manner and performs a control on a reproduction face shake correction of the video.

3. The video reproduction apparatus according to claim 1, characterized in that
  as the attribute information of the video stream, a face detection center position coordinate is recorded on the recording medium, and that the face shake correction means removes an offset of the face detection center position coordinate with respect to a screen center position and corrects the face shake through a center offset expansion processing by expanding an image for reproduction at a predetermined expansion rate at the face detection center position coordinate.

4. The video reproduction apparatus according to claim 2, characterized in that the read means reads ahead for only a plurality of screen groups, and that the face shake correction means creates a correspondence table of a frame reproduction display time and the face detection position information in units of field, calculates a shift amount of the face detection position for each field from the face detection position information for each screen group unit, and further corrects the face detection position coordinate by a moving average of a number of field sets which can be divided in a range of a maximum shift limited amount.

5. The video reproduction apparatus according to claim 2, characterized in that the read means collectively reads ahead the face detection position information together with the video stream at a timing when a read update request to a reproduction stream buffer of the video stream is generated.

6. The video reproduction apparatus according to claim 1, characterized in that the face shake correction means corrects a lateral shake by removing an offset in a horizontal direction of the face detection center position coordinate with respect to a screen center position and also corrects a vertical shake by removing an offset of a landscape horizontal detection position coordinate of a background with respect to the screen center position.

7. The video reproduction apparatus according to claim 3, characterized in that the face shake correction means provides a left and right correction width limit for performing a shift correction to a position where the face detection area is fit into a side within the screen in a case where a face detection area is partially protruded from a screen area when the image for reproduction is expanded at the predetermined expansion rate.

8. A video reproduction method of reproducing a video stream recorded on a recording medium together with attribute information accompanying in a predetermined moving picture format, face detection position information composed of a center position coordinate of a face detected from the video stream as the attribute information being recorded on the recording medium, the video reproduction method being characterized by comprising:

a read step of reading the recorded video stream together with the attribute information from the recording medium;

a decode step of decoding the read video stream;

a face shake correction step of predicting a screen shift amount on the basis of the face detection position information included in the attribute information and correcting a face shake included in the video stream; and an output step of outputting video stream after the face shake is corrected.

* * * * *